(12) United States Patent
Hibino et al.

(10) Patent No.: US 9,388,884 B2
(45) Date of Patent: Jul. 12, 2016

(54) CONTINUOUSLY VARIABLE TRANSMISSION

(71) Applicant: TOYOTA JIDOSHA KABUSHIKI KAISHA, Toyota-shi, Aichi (JP)

(72) Inventors: Akira Hibino, Susono (JP); Hiroyuki Ogawa, Susono (JP); Yuki Aratsu, Susono (JP); Mitsuaki Tomita, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/780,602

(22) PCT Filed: Dec. 11, 2013

(86) PCT No.: PCT/JP2013/083261
§ 371 (c)(1),
(2) Date: Sep. 28, 2015

(87) PCT Pub. No.: WO2014/162637
PCT Pub. Date: Sep. 10, 2014

(65) Prior Publication Data
US 2016/0053873 A1    Feb. 25, 2016

(30) Foreign Application Priority Data

Apr. 4, 2013 (JP) ................. 2013-078904

(51) Int. Cl.
*F16H 15/52* (2006.01)
*F16H 57/04* (2010.01)
*F16H 15/30* (2006.01)

(52) U.S. Cl.
CPC .............. *F16H 15/52* (2013.01); *F16H 57/043* (2013.01); *F16H 57/049* (2013.01); *F16H 57/0487* (2013.01); *F16H 15/30* (2013.01); *F16H 57/0424* (2013.01); *F16H 57/0457* (2013.01); *F16H 57/0484* (2013.01)

(58) Field of Classification Search
None
See application file for complete search history.

(56) References Cited

U.S. PATENT DOCUMENTS

| 3,662,857 | A | * | 5/1972 | de Brie Perry | F16H 15/38 184/11.1 |
|---|---|---|---|---|---|
| 5,033,989 | A | * | 7/1991 | Shimaguchi | F16H 57/0421 184/11.5 |
| 5,318,486 | A | * | 6/1994 | Lutz | B62M 11/12 475/207 |
| 2006/0084549 | A1 | | 4/2006 | Smithson et al. | |
| 2008/0032852 | A1 | | 2/2008 | Smithson et al. | |
| 2008/0032853 | A1 | | 2/2008 | Smithson et al. | |

(Continued)

FOREIGN PATENT DOCUMENTS

JP    2012-117675 A    6/2012

*Primary Examiner* — Colby M Hansen
(74) *Attorney, Agent, or Firm* — Kenyon & Kenyon LLP

(57) ABSTRACT

A continuously variable transmission includes: a transmission shaft; first to fourth power transmission elements that have a first rotation center axis coaxial with the transmission shaft; a plurality of rolling members that has a second rotation center axis; a transmission device configured to change a gear ratio between an input side and an output side by tilting each of the rolling members; a rotary shaft that is coupled with one of the first and second power transmission elements, and is provided with a cylindrical section; an annular member that is coupled with the rotary shaft, and configured to form an annular oil reservoir formed of lubricating oil; and a scraping up section configured to scrape up the lubricating oil by rotating in the circumferential direction.

6 Claims, 12 Drawing Sheets

(56) References Cited

U.S. PATENT DOCUMENTS

| | | |
|---|---|---|
| 2008/0032854 A1 | 2/2008 | Smithson et al. |
| 2008/0034585 A1 | 2/2008 | Smithson et al. |
| 2008/0034586 A1 | 2/2008 | Smithson et al. |
| 2008/0039269 A1 | 2/2008 | Smithson et al. |
| 2008/0039270 A1 | 2/2008 | Smithson et al. |
| 2008/0039271 A1 | 2/2008 | Smithson et al. |
| 2008/0039272 A1 | 2/2008 | Smithson et al. |
| 2008/0039273 A1 | 2/2008 | Smithson et al. |
| 2008/0039274 A1 | 2/2008 | Smithson et al. |
| 2008/0039275 A1 | 2/2008 | Smithson et al. |
| 2008/0039276 A1 | 2/2008 | Smithson et al. |
| 2008/0039277 A1 | 2/2008 | Smithson et al. |
| 2008/0040008 A1 | 2/2008 | Smithson et al. |
| 2008/0200300 A1 | 8/2008 | Smithson et al. |
| 2009/0221391 A1* | 9/2009 | Bazyn .................... F16H 15/52 475/159 |
| 2013/0095977 A1 | 4/2013 | Smithson et al. |

* cited by examiner

US 9,388,884 B2

CONTINUOUSLY VARIABLE TRANSMISSION

CROSS-REFERENCE TO RELATED APPLICATIONS

This is a national phase application based on the PCT International Patent Application No. PCT/JP2013/083261 Dec. 11, 2013, claiming priority to Japanese Patent Application No. 2013-078904 filed Apr. 4, 2013, the entire contents of both of which are incorporated herein by reference.

FIELD

The present invention relates to a traction drive type continuously variable transmission that is provided with a plurality of power transmission elements sharing a rotation center axis, and a plurality of rolling members disposed radially with respect to the rotation center axis, and steplessly changes a gear ratio between an input side and an output side by tilting each of the rolling members interposed between two of the power transmission elements.

BACKGROUND

Conventionally, as such a type of continuously variable transmission, a ball planetary continuously variable transmission, which is provided with a transmission shaft that serves as a center of rotation, a plurality of rolling members that is radially disposed around the transmission shaft, and a plurality of power transmission elements that interposes each of the rolling members, and is relatively rotatable with a center axis of the transmission shaft as a rotation center axis, has been known. In the ball planetary continuously variable transmission, each of the rolling members is interposed between respective inner peripheral surface sides of a first power transmission element and a second power transmission element, which are disposed to face each other, and further, each of the rolling members is disposed on an outer peripheral surface of a third power transmission element. In addition, in this continuously variable transmission, two disc sections, which form a fourth power transmission element, are disposed so as to interpose each of the rolling members in an axial direction. The following Patent Literature 1 discloses such a ball planetary continuously variable transmission. In the continuously variable transmission of Patent Literature 1, a passage of lubricating oil is formed in a first power transmission element and a second power transmission element, and further, the passage of the lubricating oil is formed also in a spacer that supports two disc sections of a fourth power transmission element. Further, in the continuously variable transmission of Patent Literature 1, the lubricating oil, deposited on an inner peripheral surface of an output shaft disposed on an outer side in a radial direction than the two disc sections, is scrapped down by the spacer provided between the two disc sections of the fourth power transmission element, and the lubricating oil is sent to a member on an inner side in the radial direction by gravity.

CITATION LIST

Patent Literature

Patent Literature 1: Japanese Patent Application Laid-open No. 2012-117675

SUMMARY

Technical Problem

Meanwhile, the lubricating oil deposited on the inner peripheral surface of the output shaft is formed in an annular shape along the inner peripheral surface by a centrifugal force caused by rotation of the output shaft. Thus, in a case where the output shaft rotates at low speed, the influence of gravity surpasses the centrifugal force so that most of the lubricating oil is deposited on the bottom of the inner peripheral surface of the output shaft. Accordingly, in the above-described continuously variable transmission of Patent Literature 1, it is difficult to supply the lubricating oil to a rolling member or the like by the scraper in the case of the operation at low speed, and an oil amount of the lubricating oil is insufficient in a contact surface between a power transmission element and the rolling member, and accordingly, there is a risk of introducing deterioration in a traction performance or durability.

Accordingly, an object of the present invention is to improve such disadvantages included in the conventional embodiment, and to provide a continuously variable transmission capable of stably supplying lubricating oil with respect to a contact surface between a power transmission element and a rolling member.

Solution to Problem

To achieve the above-described object, a continuously variable transmission according to the present invention includes: a transmission shaft that serves as a center of rotation; first to fourth power transmission elements that have a first rotation center axis coaxial with the transmission shaft, and configured to be relatively rotatable with one another in a circumferential direction; a plurality of rolling members that has a second rotation center axis, is disposed radially around the first rotation center axis, and further on an outer peripheral surface of the third power transmission element, is interposed between inner peripheral surfaces of the first and second power transmission elements, which are disposed to face each other, and further, is held by the fourth power transmission element in a freely tilting manner; a transmission device configured to change a gear ratio between an input side and an output side by tilting each of the rolling members; a rotary shaft that is coupled with one of the first and second power transmission elements, and is provided with a cylindrical section that covers the first to fourth power transmission elements, and the rolling member from an outer side in a radial direction; an annular member that is coupled with the rotary shaft, and configured to form an annular oil reservoir formed of lubricating oil along an inner peripheral surface of the cylindrical section during operation; and a scraping up section that is disposed between the first power transmission element and the second power transmission element, further, on an inner side in the radial direction than the inner peripheral surface of the cylindrical section, and further, on the outer side in the radial direction than the plurality of rolling members, and configured to scrape up the lubricating oil by rotating in the circumferential direction.

It is preferable that the scraping up section is formed such that the entire thereof is soaked in the lubricating oil of the annular oil reservoir.

It is preferable that the scraping up section is provided on the inner peripheral surface of the cylindrical section.

It is preferable that the continuously variable transmission further includes: a casing configured to cover the rotary shaft from the outer side in the radial direction; a through hole that is formed in the annular member, and configured to cause the lubricating oil of the annular oil reservoir to be discharged; a throttle hole that is formed to be communicated with the through hole of the annular member on a wall surface which faces a wall surface of the casing in the annular member, configured to guide the lubricating oil of the through hole to the inner side in the radial direction, and that is formed in an arc shape; and a through hole of the fourth power transmission element configured to guides the lubricating oil discharged from the throttle hole to a surface of the rolling member.

It is preferable that the through hole is formed such that an inner diameter of the annular oil reservoir is larger than a diameter of a circumference formed by a contact surface between the first power transmission element and the rolling member and a diameter of a circumference formed by a contact surface between the second power transmission element and the rolling member.

It is preferable that an annular partition wall is disposed on the inner peripheral surface of the cylindrical section between the first power transmission element and the second power transmission element, and the annular oil reservoir is formed between the partition wall and the annular member.

Advantageous Effects of Invention

In the continuously variable transmission according to the present invention, the lubricating oil of the oil reservoir is supplied to the contact surfaces between the respective first and second power transmission elements, and the rolling member in an operating state where the annular oil reservoir is formed (that is, in the case of operation at high speed). On the other hand, in an operating state where the annular oil reservoir is not formed (that is, in the case of operation at low speed), the scraping up section scrapes up the lubricating oil of the oil reservoir collected in the bottom. Further, the scrapped-up lubricating oil is gradually separated by the influence of gravity as the scraping up section moves in the circumferential direction, and is dripped on a surface of the rolling member present on a lower side or the like. In this manner, the continuously variable transmission is capable of supplying the lubricating oil to each of the rolling members even in the operating state where the annular oil reservoir is not formed. Accordingly, the continuously variable transmission is capable of stably supplying the lubricating oil to each of the contact surfaces regardless of the state of the operation (that is, rotation), and thus, it is possible to secure a cooling performance of the contact surface and a traction performance in the contact surface.

DESCRIPTION OF EMBODIMENTS

Figure 1:
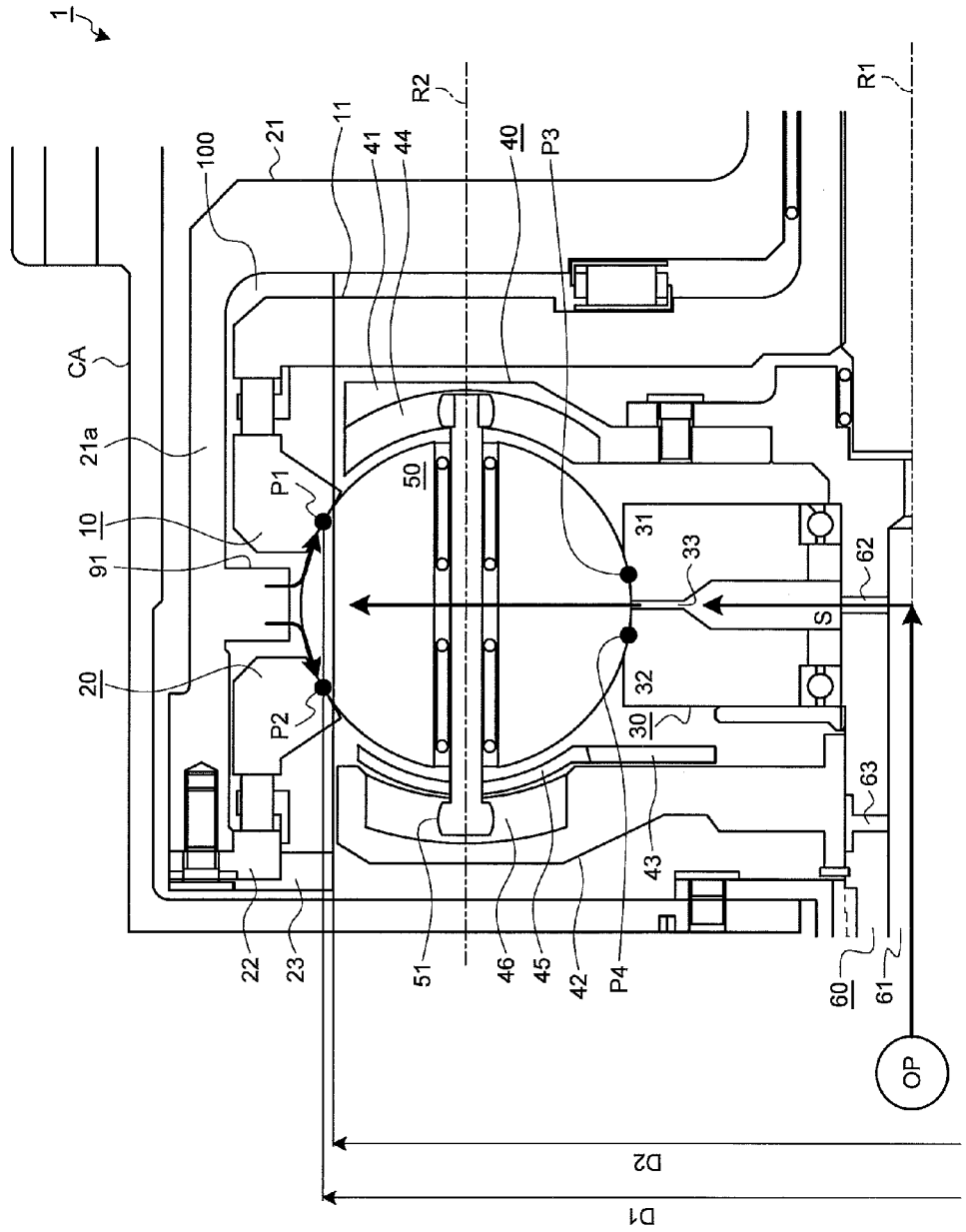
FIG. 1 is a cross-sectional view illustrating an example of a configuration according to an embodiment of a continuously variable transmission according to the present invention.

Hereinafter, a description will be made regarding examples of a continuously variable transmission according to the present invention with reference to the drawings. Further, the invention is not limited to the embodiments.

Embodiment

A description will be made regarding an embodiment of the continuously variable transmission according to the present invention with reference to FIGS. 1 to 7.

First, a description will be made regarding an example of a traction drive type continuously variable transmission of the embodiment with reference to FIG. 1. This continuously variable transmission is provided with a ball planetary continuously variable transmission mechanism which corresponds to a traction planetary mechanism. Reference numeral 1 in FIGS. 1 and 2 indicates an example of the ball planetary continuously variable transmission according to the embodiment.

A continuously variable transmission mechanism of the embodiment is provided with four power transmission elements sharing a first rotation center axis R1, a plurality of rolling members radially disposed around the first rotation center axis R1, and transmission shafts disposed at each center of rotation of four power transmission elements. The rolling member has a second rotation center axis R2, which is different from the first rotation center axis R1, and is capable of tilt motion on a tilt plane including the second rotation center axis R2 thereof and the first rotation center axis R1. Hereinafter, a direction along the first rotation center axis R1 will be referred to as an axial direction, and a direction around the first rotation center axis R1 will be referred to as a circumferential direction unless otherwise specified. In addition, a direction orthogonal to the first rotation center axis R1 will be referred to as a radial direction, and particularly, a side directed to an inner side will be referred to as an inner side in the radial direction while a side directed to an outer side will be referred to as an outer side in the radial direction.

The continuously variable transmission mechanism interposes each of the rolling members among three power transmission elements (first to third power transmission elements) of the four power transmission elements, and holds each of the rolling member by a remaining power transmission element (fourth power transmission element) so as to be rotatable and further in a freely tilting manner. Each of the rolling members is radially disposed around the first rotation center axis R1. Further, each of the rolling members is interposed between the first and second power transmission elements that are disposed to face each other in the axial direction, and further, is disposed on an outer peripheral surface of the third power transmission element.

The continuously variable transmission mechanism is capable of performing transmission of a torque via each of the rolling members among the first to fourth power transmission elements. For example, the continuously variable transmission mechanism is capable of performing the transmission of the torque (power) via each of the rolling members among the first to third power transmission elements by generating a traction force (tangential force) between each of the first to third power transmission elements and each of the rolling members. The traction force is generated by pressing at least one of the first and second power transmission elements against each of the rolling members. Further, in the continuously variable transmission mechanism, the transmission of the torque between the fourth power transmission element and each of the rolling members is also possible by allowing rotation of the fourth power transmission element.

In addition, in the continuously variable transmission mechanism, each of the rolling members is tilted by tilting the second rotation center axis R2 of each of the rolling members with respect to the first rotation center axis R1 on the tilt plane so as to change a ratio of rotational speed (number of revolutions) between an input side and an output side, that is, a gear ratio γ.

Examples of the continuously variable transmission mechanism includes a type in which all the first to fourth power transmission elements are used as rotating elements capable of relative rotation with respect to the transmission shaft, and a type in which any one of the first to fourth power transmission elements is used as a fixed element incapable of the relative rotation with respect to the transmission shaft. In the case of the former configuration, any one of the first to fourth power transmission elements becomes a torque input section, and another one thereof becomes a torque output section. On the other hand, in the case of the latter configuration, the transmission of the torque is performed via each of the rolling members among the three power transmission elements except for the fixed element, and thus, any one of the three power transmission elements becomes the torque input section, and another one thereof becomes the torque output section. Thus, in the continuously variable transmission mechanism, a ratio of the rotational speed (number of revolutions) between the power transmission element, which is the input section, and the power transmission element, which is the output section, becomes the gear ratio γ. For example, the continuously variable transmission 1 is arranged on a power transmission path in a vehicle. At this time, the input section is coupled with a power source side such as a mechanism (an engine such as an internal combustion engine) or a rotating machine (an electric motor or the like), and the output section is coupled with a drive wheel side. There is a case where an additional variable transmission (for example, a multi-step manual transmission, a multi-step automatic transmission or the like) is interposed between the continuously variable transmission 1 and the drive wheel side. In the continuously variable transmission 1, a time at which the torque from the power source is input with respect to the power transmission element, which is the input section, will be referred to as a driving time, and a time at which the torque in a reversed direction as compared to the driving time is input with respect to the power transmission element, which is the output section, in the case of being decelerated, or running in a coasting mode will be referred to as a driven time.

Here, each of the first and second power transmission elements functions as a ring gear in the traction planetary mechanism in the continuously variable transmission mechanism. In addition, the third power transmission element and the fourth power transmission element respectively function as a sun roller and a carrier in each of the traction planetary mechanisms. In addition, the rolling member functions as a ball-type pinion in the traction planetary mechanism. Accordingly, the continuously variable transmission mechanism is provided with first and second rotating members 10 and 20 as the first and second power transmission elements, a sun roller 30 as the third power transmission element, a carrier 40 as the fourth power transmission element, a planetary ball 50 as the rolling member, and a shaft 60 as the transmission shaft. The shaft 60 is fixed to various stationary parts such as a casing CA of the continuously variable transmission 1 or a vehicle body (not illustrated), and is a cylindrical or columnar fixed shaft incapable of relative rotation to the stationary part. In the continuously variable transmission 1, a state where the first rotation center axis R1 and the second rotation center axis R2 are parallel with each other on the tilt plane (state in FIGS. 1 and 2) is set to as a reference position. Hereinafter, a description will be made in detail regarding the continuously variable transmission mechanism in the continuously variable transmission 1 with reference to FIG. 2.

The first and second rotating members 10 and 20 are disc members (discs) or annular members (rings) of which central axes correspond to the first rotation center axis R1, are disposed to face each other in the axial direction, and hold each of the planetary balls 50 therebetween. In this example, the both serve as the annular members.

In the continuously variable transmission 1, the first and second rotating members 10 and 20, and each of the planetary balls 50 have contact surfaces P1 and P2, which are in point contact (to be exact, surface contact in an elliptical shape) to each other. Each of the planetary balls 50 has an outer peripheral curved surface as the rolling surface to be described later, and is interposed between the first and second rotating members 10 and 20 in the outer peripheral curved surface. In other words, each of the planetary balls 50 has the contact surfaces P1 and P2 in the outer peripheral curved surface. Meanwhile, the first and second rotating members 10 and 20 interpose each of the planetary balls 50 from the outer side in the radial direction, and have the contact surfaces P1 and P2, respectively, in inner peripheral surfaces 10a and 20a thereof. The contact surfaces P1 and P2, which are actually in contact with each of the planetary balls 50, and portions, which become the contact surfaces P1 and P2 along with the rotation of the first and second rotating members 10 and 20 (hereinafter, referred to as an "additional contact portion"), are continuously provided in the circumferential direction in the inner peripheral surfaces 10a and 20a. In other words, the additional contact portion is a portion that is repeatedly brought into contact with the planetary ball 50 and separated from the planetary ball 50 by rotation of the first and second rotating members 10 and 20. Each shape of the contact surfaces P1 and P2, and the additional contact portion of the first and second rotating members 10 and 20 is formed, for example, as a concave arc surface having a curvature equivalent to a curvature of the outer peripheral curved surface of the planetary ball 50, as a concave arc surface having a curvature different from the curvature of the outer peripheral curved surface, as a convex arc surface or as a flat surface. Further, each shape of the contact surfaces P1 and P2, and the additional contact portion of the first and second rotating members 10 and 20 is formed such that a force (normal force) to an inner side in the radial direction and further in an oblique direction is applied with respect to the planetary ball 50 when a force (pressing force) in the axial direction is applied toward the planetary ball 50 from the first and second rotating members 10 and 20.

Here, the inner peripheral surfaces 10*a* and 20*a* of the first and second rotating members 10 and 20, and the outer peripheral curved surface of each of the planetary balls 50 are formed such that each shortest distance to each of the contact surfaces P1 and P2, and the additional contact portion from the second rotation center axis R2 becomes the same length, in the state of being at the reference position described above. Further, here, the inner peripheral surfaces 10*a* and 20*a* of the first and second rotating members 10 and 20, and the outer peripheral curved surface of each of the planetary balls 50 are formed such that each contact angle θ between each of the first and second rotating members 10 and 20, and each of the planetary balls 50 becomes the same angle. The contact angle θ is an angle formed by a line connecting the contact surfaces P1 and P2 or the additional contact portion, and a center of the planetary ball 50 (the center of rotation and the center of tilt, and corresponds to the center of gravity in the case of the spherical body) with respect to a reference plane. The reference plane is a flat surface spreading in the radial direction having each center of the planetary balls 50.

In this embodiment, the first rotating member 10 is used as the torque input section during the driving time, and the second rotating member 20 is used as the torque output section during the driving time. In the continuously variable transmission 1, a side, with respect to the reference plane, on which the first rotating member 10 as the input section is disposed will be referred to as an input side of the torque, and a side, with respect to the reference plane, on which the second rotating member 20 as the output section is disposed will be referred to as an output side of the torque. Further, regarding the axial direction, a direction from the output side toward the input side will be referred to as a torque input side direction, and a direction from the input side toward the output side will be referred to as a torque output side direction. An input shaft (first rotary shaft) 11, coaxial with the first rotating member 10, is coupled with the first rotating member 10, and an output shaft (second rotary shaft) 21, coaxial with the second rotating member 20, is coupled with the second rotating member 20.

The input shaft 11 and the output shaft 21 respectively are torque transmission members, and are collectively extended to any one of the input side and the output side of the torque. The input shaft 11 and the output shaft 21 of this example are collectively extended to the input side of the torque on which the first rotating member 10 or the like is disposed. The input shaft 11 is provided with a disc section 11*a* of which an outer edge portion is coupled with the first rotating member 10, and a cylindrical section 11*b* extended in the torque input side direction from an radially inner portion of the disc section 11*a*. The disc section 11*a* is disposed in the torque input side direction than the first rotating member 10 and the carrier 40, and covers a first disc section 41 of the carrier 40, which will be described later, together with the first rotating member 10. Meanwhile, the output shaft 21 is provided with a first cylindrical section 21*a* that covers the first and second rotating members 10 and 20 from the outer side in the radial direction, a disc section 21*b* of which an outer edge is an end portion in the torque input side direction of the first cylindrical section 21*a*, and a second cylindrical section 21*c* extended in the torque input side direction from the radially inner portion of the disc section 21*b*. The first cylindrical section 21*a* is coupled with the second rotating member 20 via an annular member 22 which is fixed to an end portion in the torque output side direction. The disc section 21*b* is disposed in the torque input side direction than the disc section 11*a* of the input shaft 11. The second cylindrical section 21*c* covers the cylindrical section 11*b* of the input shaft 11 from the outer side in the radial direction.

The input shaft 11 is coupled with a rotary shaft 12 that is connected to the power source side. The rotary shaft 12 is disposed to be coaxial with the shaft 60, and is connected to an end portion of the shaft 60 via a bearing B1. Accordingly, the input shaft 11 is capable of relative rotation in the circumferential direction in an integrated manner with the rotary shaft 12, with respect to the shaft 60. In addition, a bearing B2 and a thrust bearing TB are interposed between the input shaft 11 and the output shaft 21. Thus, the output shaft 21 is capable of relative rotation in the circumferential direction with respect to the input shaft 11, and further is capable of relative rotation in the circumferential direction also with respect to the shaft 60.

An axial force generating section 71 that generates an axial force is provided between the input shaft 11 and the first rotating member 10. The axial force is a pressing force in the axial direction that allows the first rotating member 10 to be pressed against each of the planetary balls 50. Here, a torque cam is used as the axial force generating section 71. Accordingly, the axial force generating section 71 generates the axial force between the input shaft 11 and the first rotating member 10 by causing an engaging portion or an engaging member in the outer edge portion of the disc section 11*a* to be coupled with an engaging portion or an engaging member of the first rotating member 10 side, further transmits a rotational torque, and rotates the input shaft 11 and the first rotating member 10 in an integrated manner. Meanwhile, an axial force generating section 72 is provided also between the output shaft 21 and the second rotating member 20 in the continuously variable transmission 1. The axial force generating section 72 generates a pressing force in the axial direction (axial force) that allows the second rotating member 20 to be pressed against each of the planetary balls 50, and the torque cam, similarly to the axial force generating section 71, is used. The axial force generating section 72 is connected to the output shaft 21 via the annular member 22.

The continuously variable transmission 1 is capable of generating the traction force during the operation, by the axial force, between the first rotating member 10 and each of the planetary balls 50, between the second rotating member 20 and each of the planetary balls 50, and between the sun roller 30 and each of the planetary balls 50.

Further, in the continuously variable transmission 1, it is possible to set the first rotating member 10 as the torque output section, and further, set the second rotating member 20 as the torque input section. In such a case, a member provided as the input shaft 11 is used as the output shaft, and a member provided as the output shaft 21 is used as the input shaft. In addition, in a case where the sun roller 30 and the carrier 40 are used, respectively, as the torque input section and the torque output section, an input shaft and an output shaft, which are additionally configured, are coupled with the sun roller 30 and the carrier 40.

The sun roller 30 is disposed to be coaxial with the shaft 60, and performs relative rotation in the circumferential direction with respect to the shaft 60. A plurality of the planetary balls 50 is radially disposed at approximately equal intervals on an outer peripheral surface of the sun roller 30. Accordingly, in the sun roller 30, the outer peripheral surface serves as a rolling surface for each of the planetary balls 50 when each of the planetary balls 50 rotates around its own rotation axis. The sun roller 30 is capable of allowing each of the planetary balls 50 to be rolled (rotated around its own axis), by rotating motion thereof, and also is capable of rotating along with the rolling motion (rotating motion) of each of the planetary balls 50.

The sun roller 30 of this embodiment is configured by disgregating the contact surface with each of the planetary balls 50 into two places in the axial direction (a first contact surface P3 and a second contact surface P4). The reason is that, by disgregating a contact force between the sun roller 30 and the planetary ball 50, it is possible to suppress deterioration in efficiency of power transmission by reducing a surface pressure and reducing a spin loss, and possible to improve durability. The first contact surface P3 is provided on one side in the axial direction around the reference plane. On the other hand, the second contact surface P4 is provided on the other side in the axial direction around the reference plane. Further, the first and second contact surfaces P3 and P4 are provided at positions having the same distance from the center of each of the planetary balls 50 (the center of rotation and the center of tilt, and corresponds to the center of gravity in the case of the spherical body), and further, having the same shortest distance from the first rotation center axis R1. The sun roller 30 and each of the planetary balls 50 are in point contact (to be exact, surface contact) with each other in the first and second contact surfaces P3 and P4. Further, hereinafter, the first and second contact surfaces P3 and P4 will be referred to simply as the contact surfaces P3 and P4 in some cases.

The sun roller 30 is divided into two rotating bodies (a first rotating body 31 and a second rotating body 32) each of which is capable of relative rotation in the circumferential direction with respect to the shaft 60. The first contact surface P3 is provided in the first rotating body 31, and the second contact surface P4 is provided in the second rotating body 32. It is because an energy loss between the sun roller 30 and the planetary ball 50 is reduced, and it is possible to suppress the deterioration in the efficiency of power transmission by causing the first and second rotating bodies 31 and 32 to rotate in the circumferential direction relatively to each other.

In the sun roller 30, the first rotating body 31 is disposed on the one side in the axial direction around the reference plane, and the second rotating body 32 is disposed on the other side in the axial direction around the reference plane. The first and second rotating bodies 31 and 32 are attached to the shaft 60 via an angular bearing AB and a radial bearing RB, respectively, so as to perform the relative rotation in the circumferential direction with respect to the shaft 60.

In the first contact surface P3, a pressing force in the axial direction of the second rotating body 32 side, and further in the oblique direction toward the outer side in the radial direction is applied from the first rotating body 31 with respect to the planetary ball 50. On the other hand, in the second contact surface P4, a pressing force in the axial direction of the first rotating body 31 side, and further in the oblique direction toward the outer side in the radial direction is applied from the second rotating body 32 with respect to the planetary ball 50. Thus, the first rotating body 31 has a conical portion of which an outer diameter uniformly decreases as approaching the second rotating body 32, and further, the second rotating body 32 has a conical portion of which an outer diameter uniformly decreases as approaching the first rotating body 31, in the sun roller 30. The first contact surface P3 and the second contact surface P4 are provided on an outer peripheral surface each of the conical portions. In addition, the first rotating body 31 and the second rotating body 32 may replace the conical portion with an arcuate cone portion. The arcuate cone portion has a shape of which an outer diameter parabolically decreases as approaching the rotating body on the other side. The first contact surface P3 and the second contact surface P4 are provided on an outer peripheral surface of each of the arcuate cone portions. The conical portion and the arcuate cone portion are formed on the entire or a part of the outer peripheral surfaces of the first rotating body 31 and the second rotating body 32.

The planetary ball 50 is the rolling member that rolls on the outer peripheral surface of the sun roller 30 around a support shaft 51. The planetary ball 50 is preferably a complete spherical body, and may be a member having a spherical shape at least in a rolling direction, such as a rugby ball that has a cross section in an elliptical shape. The support shaft 51 penetrates through the center of the planetary ball 50, and supports the planetary ball 50 so as to be rotatable. For example, the planetary ball 50 performs the relative rotation around the second rotation center axis R2 with respect to the support shaft 51 (that is, rotates around its own axis) using a bearing such as a needle bearing arranged between the planetary ball 50 and an outer peripheral surface of the support shaft 51. Both ends of the support shaft 51 are provided to protrude from the planetary ball 50.

Figure 2:
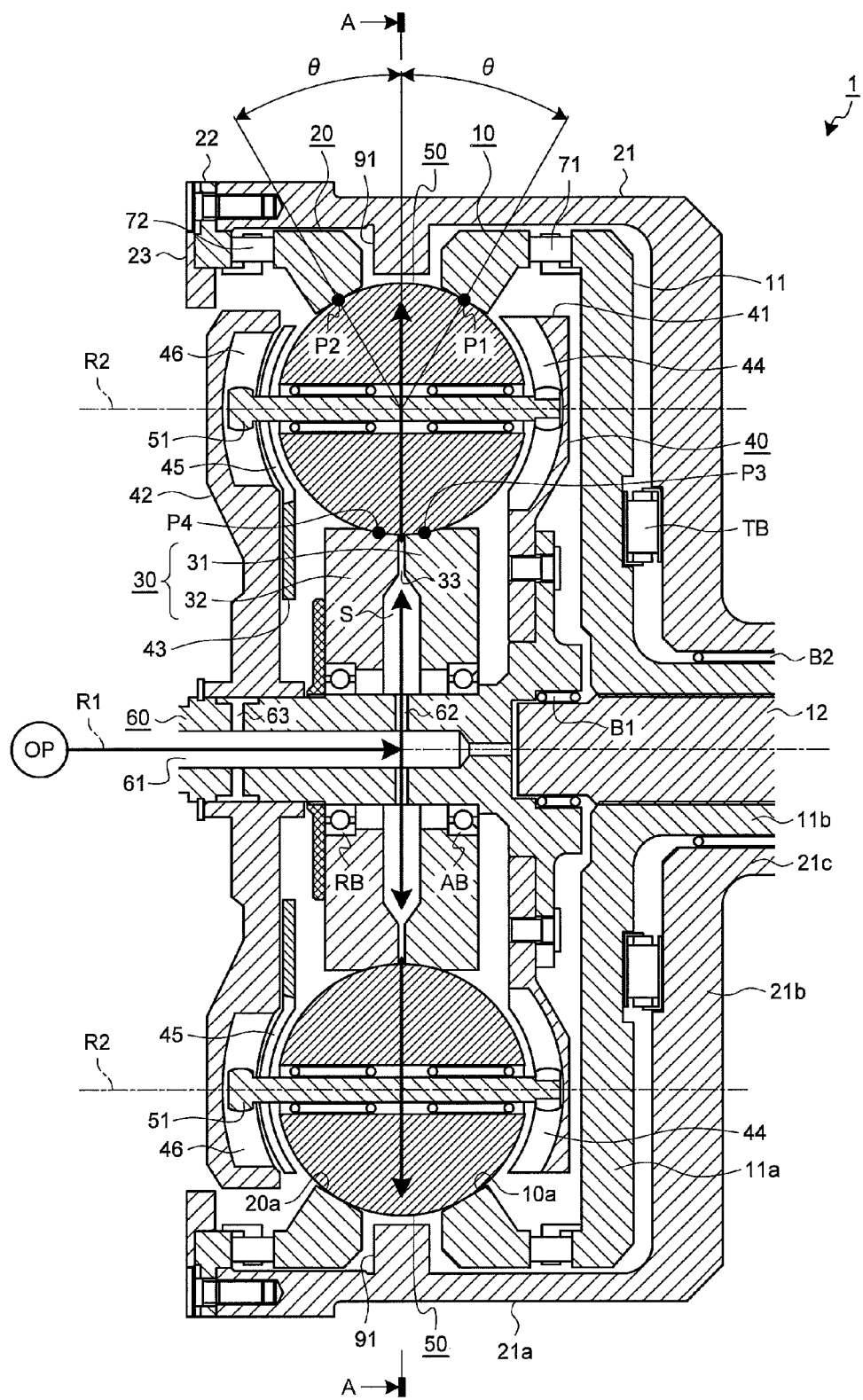
FIG. 2 is a cross-sectional view illustrating an embodiment of a configuration of a continuously variable transmission mechanism in the continuously variable transmission according to the present invention.

A position serving as a reference of the support shaft 51 is the above-described reference position illustrated in FIG. 2, and is a position at which the second rotation center axis R2 is parallel with the first rotation center axis R1. The support shaft 51 is capable of swinging (being tilted) together with the planetary ball 50 between the reference position and a position inclined therefrom in the tilt plane. The tilting is performed in the tilt plane having the center of the planetary ball 50 as a fulcrum.

The carrier 40 supports each of the protruding portions of the support shaft 51 so as not to interfere the tilt motion of each of the planetary balls 50. For example, the carrier 40 has the first to third disc sections 41, 42 and 43, of which center axes match with the first rotation center axis R1, and further, which are disposed to face one another in the axial direction. The first disc section 41 and the second disc section 42 are disposed in the axial direction at intervals, and the third disc section 43 is disposed to be close to one thereof in the carrier 40. Further, the sun roller 30 and the planetary ball 50 are disposed between two disc sections among the first to third disc sections 41, 42 and 43 in the carrier 40. In this embodiment, the third disc section 43 is disposed between the first disc section 41 and the second disc section 42 so as to be close to the second disc section 42, and the sun roller 30 and the planetary ball 50 are disposed between the first disc section 41 and the third disc section 43. Further, the third disc section 43 is not necessarily provided in the carrier 40.

In the carrier 40, one of the first and second disc sections 41 and 42 is configured so as to relatively rotate in the circumferential direction with respect to the shaft 60, and the other thereof is configured so as not to relatively rotate in the circumferential direction with respect to the shaft 60. In addition, the third disc section 43 is configured so as not to relatively rotate in the circumferential direction with respect to the shaft 60.

In this embodiment, the first and third disc sections 41 and 43 are configured to be incapable of the relative rotation with respect to the shaft 60, and the second disc section 42 is configured to be capable of the relative rotation with respect to the shaft 60. An inner diameter side of the first disc section 41 is fixed to an outer diameter side of the shaft 60 by, for example, a screw member or the like. An inner diameter side of the second disc section 42 is attached to the outer diameter side of the shaft 60 by a bearing (not illustrated). The third disc section 43 is connected to the first disc section 41 by, for example, support shafts to be described later. The first disc section 41 and the third disc section 43 form a basket shape by the respective support shafts, and cause a portion of the planetary ball 50 to protrude from a clearance between the respective support shafts. Further, the first and second rotating members 10 and 20 are in contact with the protruding portion of the planetary ball 50. Hereinafter, the first disc section 41 will be referred to as the first fixed disc section 41, the second disc section 42 will be referred to as the rotating disc section 42, and the third disc section 43 will be referred to as the second fixed disc section 43.

In the continuously variable transmission 1, the first rotating member 10, the second rotating member 20, the sun roller 30, the carrier 40, the planetary ball 50, the shaft 60, the axial force generating sections 71 and 72, the input shaft 11 and the output shaft 21 are housed in hermetically sealed the casing CA. The shaft 60, the cylindrical section 11b of the input shaft 11, and the second cylindrical section 21c of the output shaft 21 protrude from the casing CA in the axial direction while maintaining the sealed state of the casing CA.

Here, in the continuously variable transmission 1, the first rotating member 10 and the second rotating member 20 rotate at the same rotational speed (the same number of revolutions) when the tilting angle of each of the planetary balls 50 is at the reference position, that is, zero degree. In other words, in such a case, a rotation ratio (a ratio of the rotational speed or the number of revolutions) of the first rotating member 10 with respect to the second rotating member 20 becomes one, and the gear ratio γ becomes one. On the other hand, when each of the planetary balls 50 is tilted from the reference position, the shortest distance from the center axis (the second rotation center axis R2) of the support shaft 51 to the contact surface P1 with the first rotating member 10 is changed, and the shortest distance from the center axis of the support shaft 51 to the contact surface P2 with the second rotating member 20 is changed. Thus, any one of the first rotating member 10 or the second rotating member 20 rotates at high speed than at the time of the reference position, and the other one rotates at low speed. For example, the second rotating member 20 rotates at low speed (decelerated) than the first rotating member 10 when the planetary ball 50 is tilted to one side, and rotates at high speed (accelerated) than the first rotating member 10 when the planetary ball 50 is tilted to the other side. Accordingly, it is possible to steplessly change the rotation ratio (the gear ratio γ) of the first rotating member 10 with respect to the second rotating member 20 by changing the tilting angle in the continuously variable transmission 1. Further, at the acceleration time (γ<1), the planetary ball 50 of the upper side in FIG. 2 is tilted counterclockwise of the drawing, and further, the planetary ball 50 of the lower side is tilted clockwise of the drawing. In addition, at the deceleration time (γ>1), the planetary ball 50 of the upper side in FIG. 2 is tilted clockwise of the drawing, and further, the planetary ball 50 of the lower side is tilted counterclockwise of the drawing.

A transmission device that changes the gear ratio γ is provided in the continuously variable transmission 1. Since the gear ratio γ varies along with a change in the tilting angle of the planetary ball 50, a tilt device that tilts each of the planetary balls 50 is used as the transmission device. Here, the carrier 40 is allowed to function as the tilt device (the transmission device).

Figure 3:
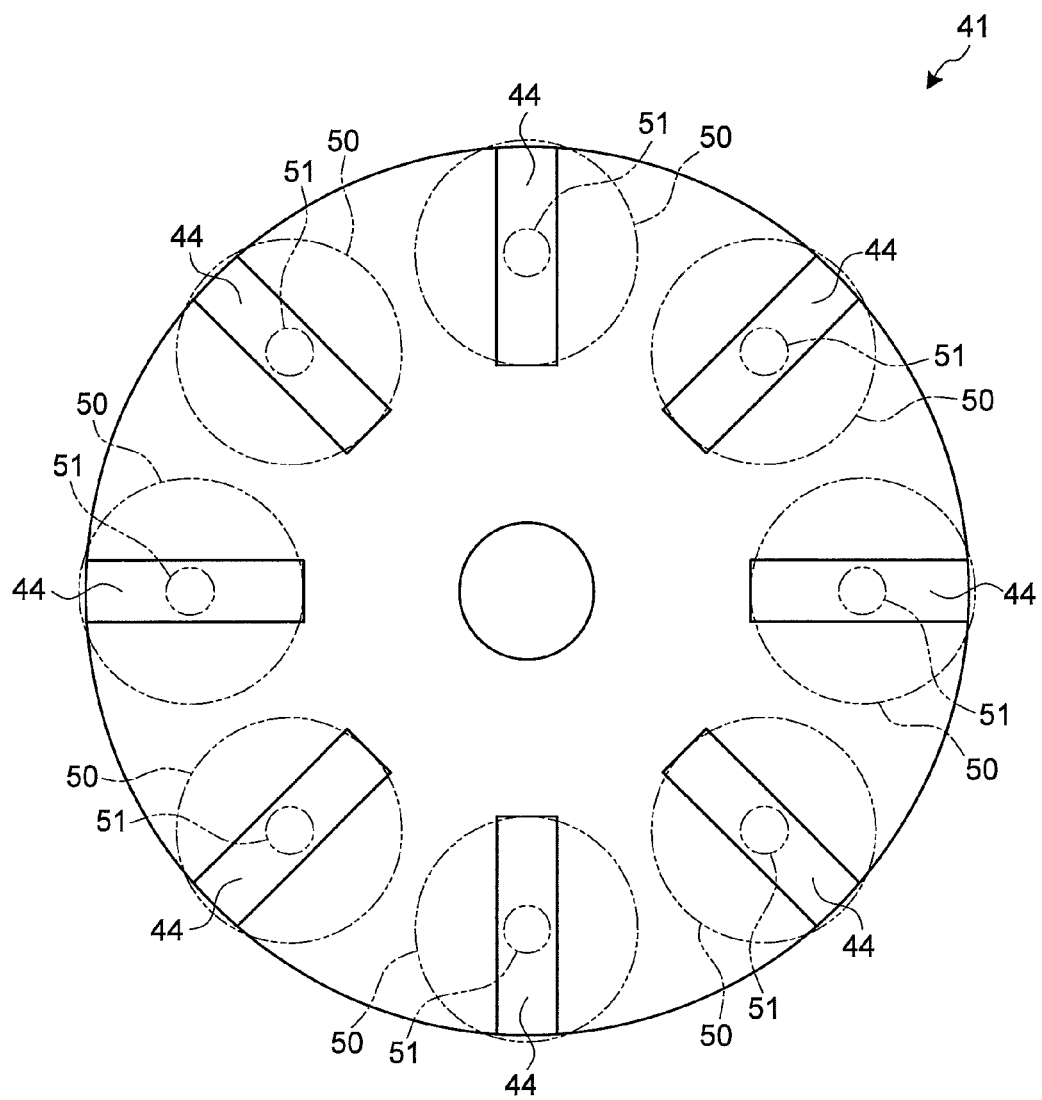
FIG. 3 is a diagram describing one fixed disc section of a carrier of the embodiment.
Figure 4:
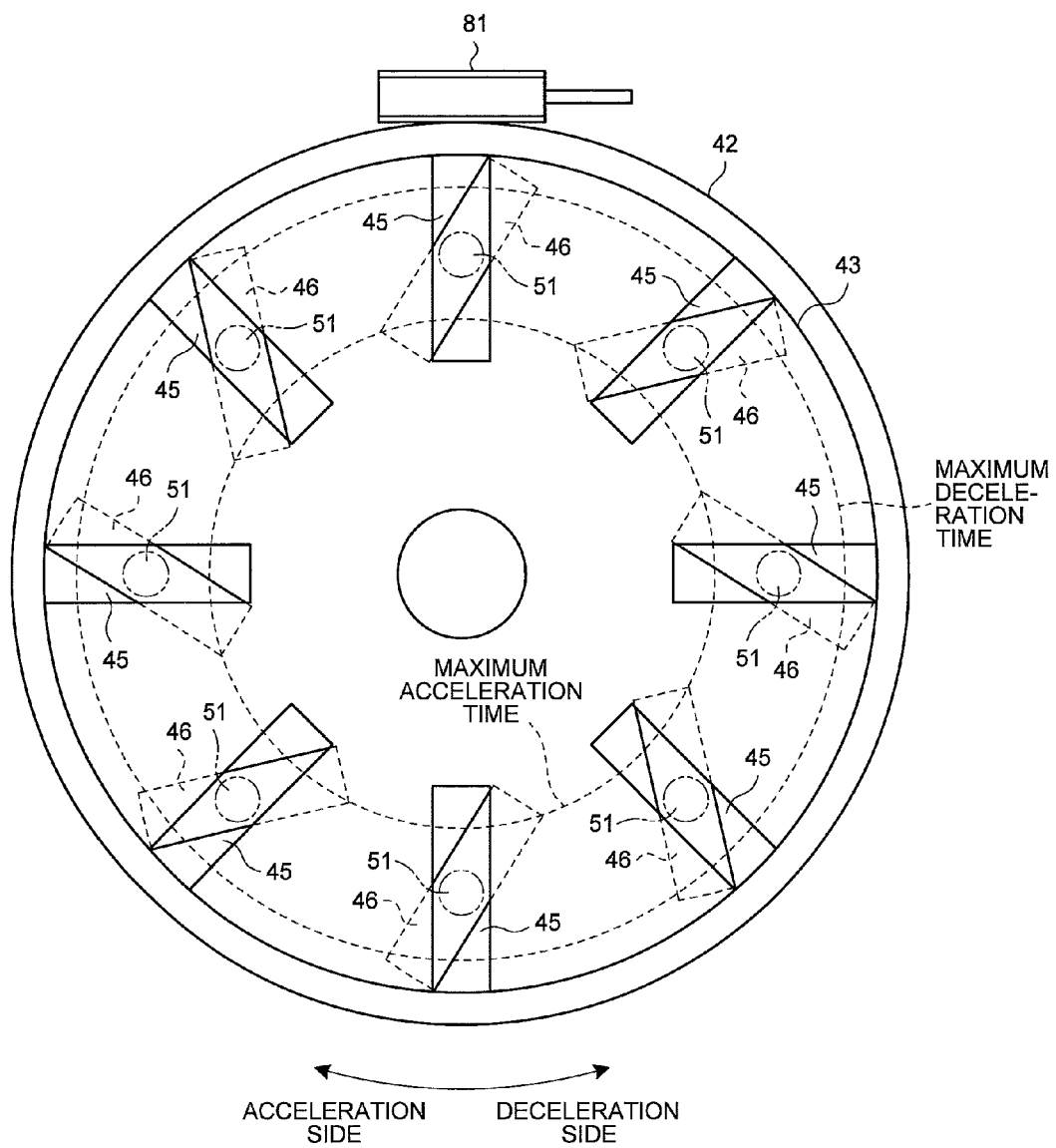
FIG. 4 is a diagram describing the other fixed disc section and a rotating disc section in the carrier of the embodiment.

First, radial direction guide sections 44 and 45 are provided for each of the planetary balls 50 in the first and second fixed disc sections 41 and 43. The radial direction guide sections 44 and 45 are guide sections that guide an end portion of the support shaft 51 in the radial direction when a tilting force is applied to the end portion thereof protruding from the planetary ball 50. The radial direction guide section 44 is, for example, a guide groove or a guide hole of which a longitudinal direction is the radial direction (FIG. 3). On the other hand, the radial direction guide section 45 is a guide hole of which a longitudinal direction is the radial direction (FIG. 4), and causes the support shaft 51 to penetrate therethrough. In other words, the radial direction guide sections 44 and 45 are formed in a radial shape around the first rotation center axis R1 when viewed from the axial direction in the first and second fixed disc sections 41 and 43. The respective radial direction guide sections 44 and 45 are formed to face each other in the axial direction, and hold the support shaft 51 such that the second rotation center axis R2 is positioned substantially on the tilt plane regardless of the magnitude of the gear ratio γ. Here, the term of "substantially" is used because a slight clearance is provided between the support shaft 51 and each of the radial direction guide sections 44 and 45 in the width direction in order for smooth tilt motion of the support shaft 51. Further, FIG. 3 is a diagram of the first fixed disc section 41 viewed in the axial direction from the planetary ball 50 side. FIG. 4 is a diagram of the rotating disc section 42 and the second fixed disc section 43 viewed in the axial direction from the planetary ball 50 side.

As described above, the rotating disc section 42 is capable of the relative rotation in the circumferential direction with respect to the shaft 60. An actuator (driving section) such as an electric motor (not illustrated) is used for the relative rotation. A driving force of the driving section is transmitted to the rotating disc section 42 via a gear such as a worm gear 81 illustrated in FIG. 4, or a gear group such as a planetary gear mechanism.

A tilting force applying section 46 is provided for each of the planetary balls 50 in the rotating disc section 42. The tilting force applying section 46 causes the tilting force to act on one end portion of the support shaft 51 protruding from the planetary ball 50, along with the rotation of the rotating disc section 42. For example, the tilting force applying section 46 is a linear groove or hole (FIG. 4) of which a longitudinal direction is inclined at a predetermined inclination angle with respect to the radial direction. When viewed from the axial direction, a portion of the tilting force applying section 46 overlaps with a portion of the radial direction guide section 45. An intersecting portion at which both the portions overlap with each other moves in the radial direction along with the rotation of the rotating disc section 42. One end portion of the support shaft 51 is supported at the intersecting portion. Accordingly, when the rotating disc section 42 is rotated, the tilting force is applied from a side wall portion of the tilting force applying section 46 with respect to the one end portion of the support shaft 51, and the end portion is guided in the radial direction by the radial direction guide sections 44 and 45. This guide motion becomes the tilt motion of the planetary ball 50 in the continuously variable transmission 1.

To be specific, the tilting force depending on the relative rotation is applied to one end portion of the support shaft 51 by causing the first fixed disc section 41 and the rotating disc section 42 to relatively rotate in the carrier 40. For example, when the rotating disc section 42 is rotated clockwise of the drawing of FIG. 4, a side wall of the tilting force applying section 46 pushes one end portion of the support shaft 51 along the side wall to the outer side in the radial direction. At this time, the pushing force to move becomes the tilting force, and the one end portion of the support shaft 51 is moved to the inner side in the radial direction by the radial direction guide sections 44 and 45, and thus, the gear ratio γ is shifted to an acceleration side. On the other hand, when the rotating disc section 42 is rotated counterclockwise of the drawing of FIG.

4, a side wall of the tilting force applying section 46 pushes one end portion of the support shaft 51 along the side wall to the inner side in the radial direction. At this time, the pushing force to move becomes the tilting force, and the one end portion of the support shaft 51 is moved to the outer side in the radial direction by the radial direction guide sections 44 and 45, and thus the gear ratio γ is shifted to a deceleration side. Further, since the planetary ball 50 is interposed by the first rotating member 10, the second rotating member 20 and the sun roller 30, the planetary ball 50 is tilted with a position of the center of gravity as the center of tilt in the case of the spherical body.

Lubricating oil (so-called traction oil) is used for cooling of each part (object to be cooled or object to be lubricated) or generation of the traction force in the continuously variable transmission 1. The lubricating oil is supplied from an oil pump OP illustrated in FIGS. 1 and 2.

The lubricating oil to be supplied from the oil pump OP is continuously supplied to an axial oil passage 61 of the shaft 60 during the operation. Radial direction oil passages 62 and 63 are formed in the shaft 60, and the lubricating oil of the axial oil passage 61 is supplied from the radial direction oil passages 62 and 63 to each part of the continuously variable transmission 1. The bold arrow illustrated in FIGS. 1 and 2 indicates a part of a supply path of the lubricating oil. The radial direction oil passage 62 is an oil passage extending in the radial direction, and supplies the lubricating oil of the axial oil passage 61 to an inner portion of the continuously variable transmission 1 (that is, inside the casing CA) from an inner side in radial direction toward an outer side in radial direction. Accordingly, a discharge hole of the lubricating oil in the radial direction oil passage 62 serves as a lubricating oil supply hole for supplying lubricating oil inside the casing CA. For example, at least one radial direction oil passage 62 is formed on the above-described reference plane (that is, the inner side in radial direction of the sun roller 30) in the shaft 60. In this example, two radial direction oil passages 62 are formed. The radial direction oil passage 62 supplies the lubricating oil of the axial oil passage 61 to an annular clearance S formed between the first rotating body 31 and the second rotating body 32. Further, the clearance S is preferably provided to have a thickness in the axial direction so as to store the supplied lubricating oil.

The lubricating oil of the clearance S is discharged from an annular clearance (hereinafter, referred to as an "annular oil passage") 33 between the first rotating body 31 and the second rotating body 32 to the outer side in the radial direction by a centrifugal force caused by the rotation of the sun roller 30 and pressure due to the pumping of the oil pump OP. Further, the annular oil passage 33 is thinner in the axial direction than the clearance S.

Some of the lubricating oil discharged from the annular oil passage 33 is brought into contact close with the contact surfaces P3 and P4 in the surface of the planetary ball 50, and other oil is sent to a clearance between the neighboring planetary balls 50.

Most of the lubricating oil brought into contact close with the contact surfaces P3 and P4 is supplied to a portion (particularly the contact surfaces P3 and P4) between the sun roller 30 and the planetary ball 50. Thus, the lubricating oil discharged from the annular oil passage 33 contributes to the cooling of the contact surfaces P3 and P4 and the generation of the traction force in the contact surfaces P3 and P4 the contact surfaces P3 and P4.

Some of the lubricating oil sent to the clearance between the planetary balls 50 is also brought into contact with the surface of the planetary ball 50 in the continuously variable transmission 1. Further, some of the lubricating oil attached to the surface of the planetary ball 50 is sent to a direction of the rotation of the planetary ball 50 in the attached state. The direction of rotation varies according to the tilting angle (the gear ratio γ) of the planetary ball 50. Thus, the lubricating oil is supplied to the contact surfaces P3 and P4 when the contact surfaces P3 and P4 are present in the direction of rotation, and is supplied to the contact surfaces P1 and P2 when the contact surfaces P1 and P2 are present in the direction of rotation. Further, some of the lubricating oil attached to the surface or the like of the planetary ball 50 is sent toward an inner peripheral surface of the first cylindrical section 21a or the like by the centrifugal force caused by each rotation.

Further, some of lubricating oil sent to the clearance between the planetary balls 50 is sent to the outer side in the radial direction through the clearance. Further, some of the lubricating oil is scattered and sent toward the additional contact portion in the inner peripheral surfaces 10a and 20a of the first and second rotating members 10 and 20, and other oil is sent toward the inner peripheral surface of the first cylindrical section 21a of the output shaft 21. The lubricating oil attached to the additional contact portion of the first and second rotating members 10 and 20 is sent to the contact surfaces P1 and P2 along with the rotation of the first and second rotating members 10 and 20.

Figure 5:
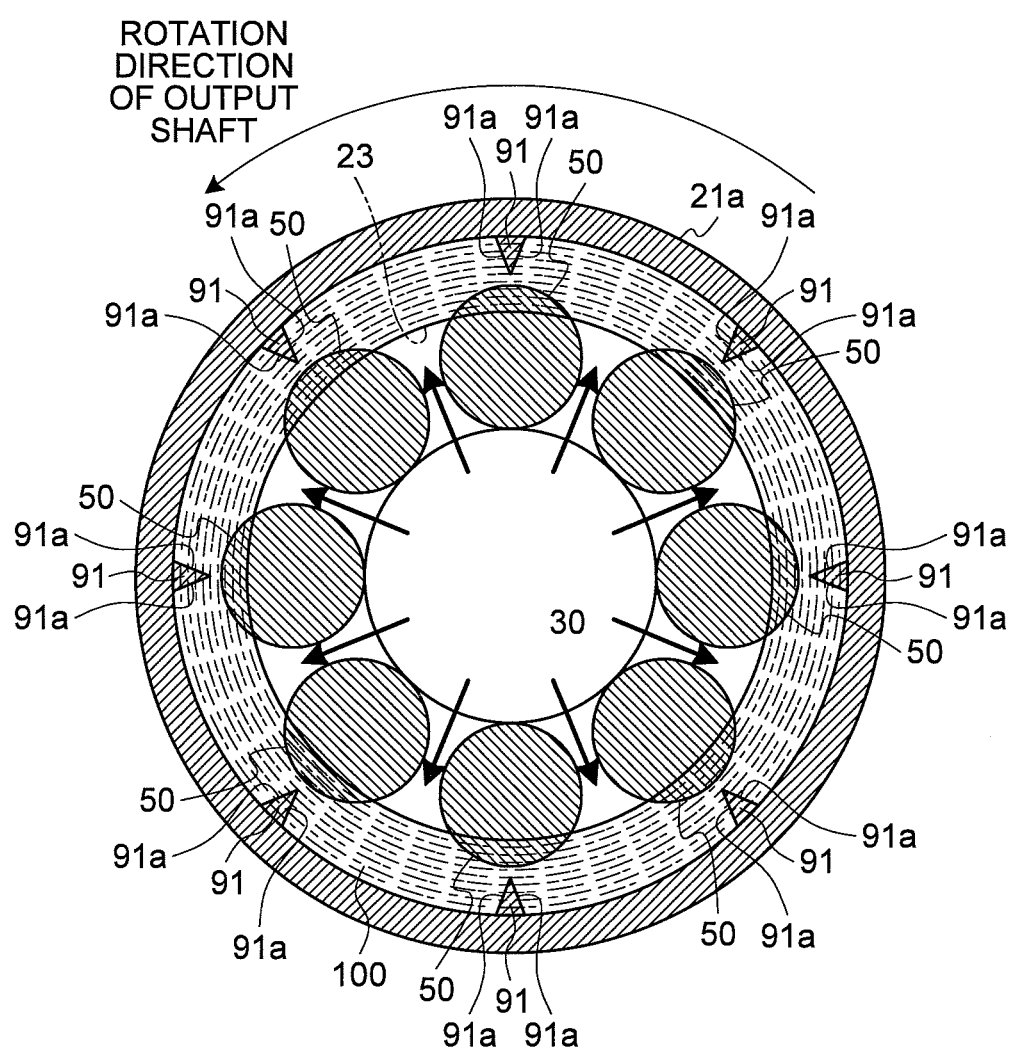
FIG. 5 is a diagram describing a relationship between a scraping up section and an annular oil reservoir.

Here, the lubricating oil sent toward the inner peripheral surface of the first cylindrical section 21a can become an annular oil reservoir 100 along the inner peripheral surface by the centrifugal force caused by the rotation of the first cylindrical section 21a (FIG. 5). In the continuously variable transmission 1, a cooling performance of the contact surfaces P1 and P2 and a traction performance in the contact surfaces P1 and P2 are improved by immersing the contact surfaces P1 and P2 in the annular oil reservoir 100. Thus, in the continuously variable transmission 1, the oil reservoir 100 is formed so as to have an inner diameter D2 smaller than a diameter D1 of the circumference formed by the contact surfaces P1 and P2 of each of the planetary balls 50. In the continuously variable transmission 1 of this example, the inner diameter of the annular member 22 is larger than the diameter D1 of the circumference formed by the contact surfaces P1 and P2, and thus, an annular member 23 having the inner diameter D2 equivalent to the oil reservoir 100 is provided so as to prevent the lubricating oil from escaping from the clearance between the annular member 22 and the casing CA. The annular member 23 is a member for forming the oil reservoir 100, and thus, will be referred to as the "oil collecting member 23" hereinafter. The oil collecting member 23 tightens the first cylindrical section 21a together with the annular member 22. A surplus amount of the lubricating oil supplied from the oil pump OP is discharged to outside from the clearance between the oil collecting member 23 and the casing CA.

Figure 6:
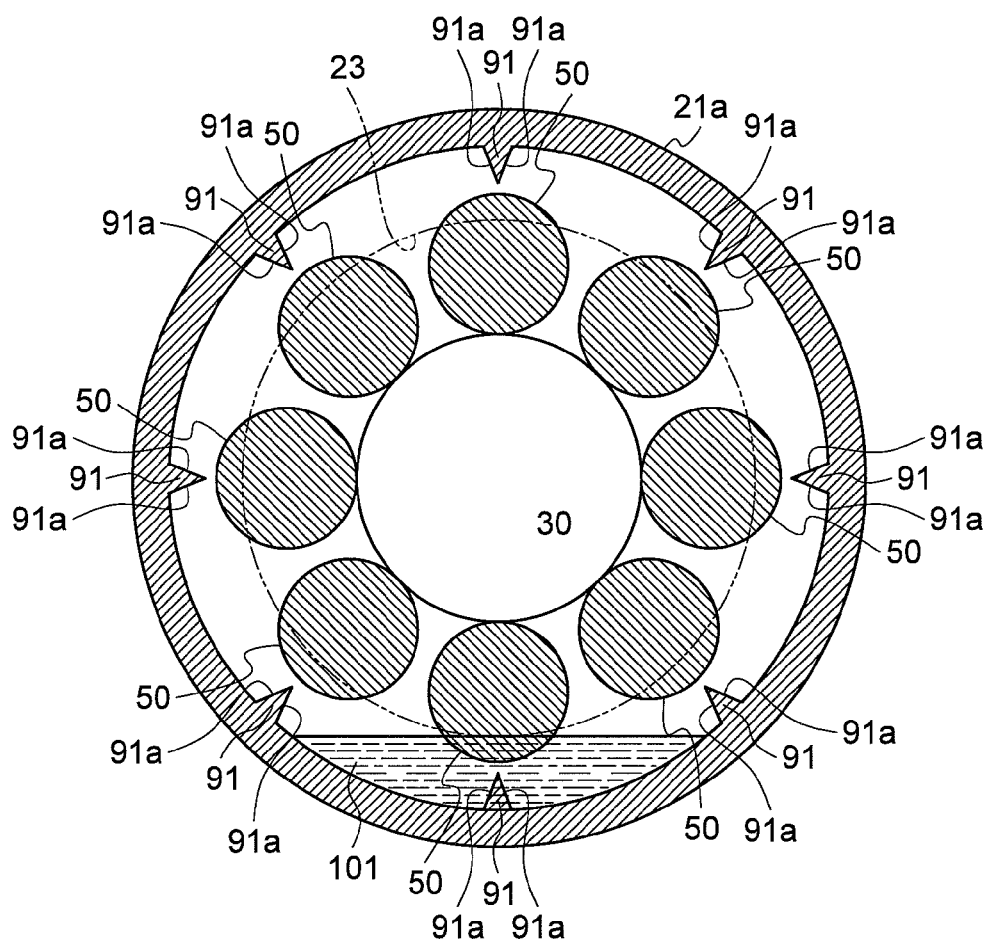
FIG. 6 is a diagram describing a relationship between the scraping up section and the oil reservoir at the bottom.

In the continuously variable transmission 1, the lubricating oil of the annular oil reservoir 100 drops by gravity when the operation stops, and some of the lubricating oil exceeds an inner wall surface of the bottom of the oil collecting member 23 and is spilled from the clearance between the oil collecting member 23 and the casing CA. The spilled lubricating oil is discharged from the clearance between the output shaft 21 and the casing CA, and is sent to the oil pump OP during the next operation. Here, the lubricating oil that remains without exceeding the inner wall surface of the oil collecting member 23 becomes an oil reservoir 101 (FIG. 6). The lubricating oil of the oil reservoir 101 at the bottom is pulled, by the rotation of the output shaft 21, in the rotation direction along with the start of the operation of the continuously variable transmission 1. Accordingly, at the next time of operation, the annular oil reservoir 100 is formed by the lubricating oil of the oil reservoir 101 and the lubricating oil supplied from the oil pump OP.

Meanwhile, the annular oil reservoir 100 is formed when the influence of the centrifugal force caused by the rotation of the output shaft 21 is stronger than gravity. Accordingly, when the influence of gravity is stronger than the centrifugal force, the annular oil reservoir 100 is hardly formed even during the operation, and there is a possibility that the lubricating oil is left still in the state of substantially the oil reservoir 101. In other words, in the continuously variable transmission 1, the annular oil reservoir 100 is easily formed as the output shaft 21 rotates at high speed, and the annular oil reservoir 100 is hardly formed as the output shaft 21 rotates at low speed. Accordingly, in a case where the annular oil reservoir 100 is not formed, a shortage of the lubricating oil occurs in the contact surfaces P1 and P2 of the planetary ball 50 which are not soaked in the oil reservoir 101 at the bottom so that there is a possibility that the cooling performance of the contact surfaces P1 and P2 or the traction performance of the contact surfaces P1 and P2 deteriorates. In particular, in a case where the carrier 40 is used as the fixed element, the planetary ball 50 does not revolve around the first rotation center axis R1 so that the shortage of the lubricating oil becomes significant in the contact surfaces P1 and P2 which are not soaked in the oil reservoir 101.

Accordingly, at least one scraping up section 91 that scrapes up the lubricating oil of the oil reservoir 101 at the bottom and supplies the lubricating oil to the planetary ball 50 which is not soaked in the oil reservoir 101 is provided in the continuously variable transmission 1 in order to be capable of securing the cooling performance or the traction performance in each of the contact surfaces P1 and P2 even in the case of the operation at low speed.

As illustrated in FIGS. 1 and 2, the scraping up section 91 is disposed between the first rotating member 10 and the second rotating member 20, further, to an inner side in the radial direction than the inner peripheral surface of the first cylindrical section 21a, and further, to an outer side in the radial direction than each of the planetary balls 50.

In this example, an upright section that is upright from the inner peripheral surface of the first cylindrical section 21a toward the inner side in the radial direction is used as the scraping up section 91. A plurality of the scraping up sections 91 are provided at approximately equal intervals in the circumferential direction in the continuously variable transmission 1 (FIGS. 5 and 6). Here, all the scraping up sections 91 are provided in the same shape, but the scraping up sections having different shapes may be provided together.

The scraping up section 91 has at least one flat surface or curved surface directed in the rotation direction of the output shaft 21. The flat surface or curved surface becomes a scraping up surface 91a of the lubricating oil that is responsible for scraping up the lubricating oil of the oil reservoir 101, and supplying the lubricating oil to the planetary ball 50. In this example, the scraping up section 91 having a cross section orthogonal to the axial direction in an isosceles triangle is formed, and thus, it is possible to use two flat surfaces forming two sides of the triangle as the scraping up surface 91a of the lubricating oil. In other words, the scraping up section 91 of this example, it is possible to supply the lubricating oil of the oil reservoir 101 to the planetary ball 50, which is not soaked in the oil reservoir 101, regardless of any direction in which the output shaft 21 rotates.

Figure 7:
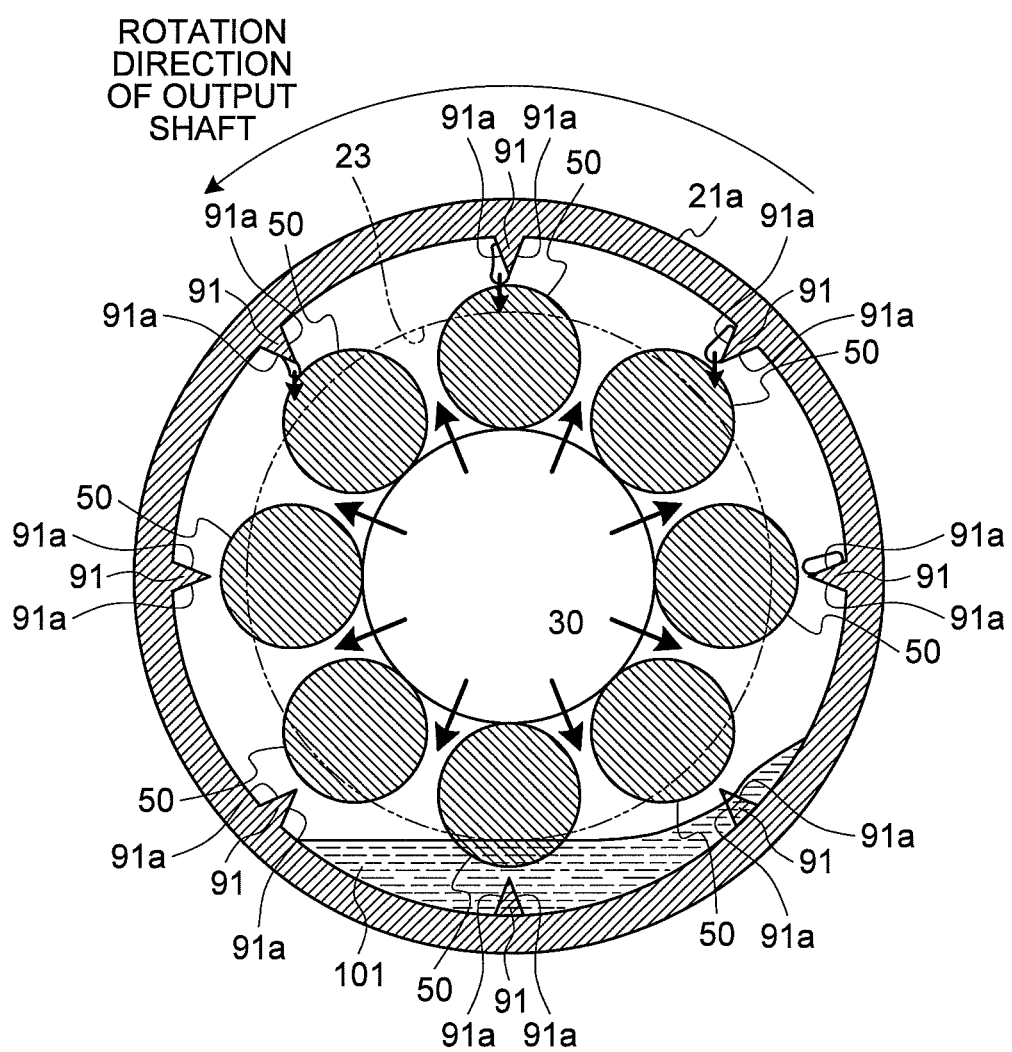
FIG. 7 is a diagram describing a relationship between the scraping up section and the oil reservoir at the bottom in the case of operation at low speed.

In the continuously variable transmission 1, in the operating state where the annular oil reservoir 100 is not formed (that is, in the case of the operation at low speed), the scraping up surface 91a of the scraping up section 91 scrapes up the lubricating oil of the oil reservoir 101 along with the rotation of the output shaft 21 as illustrated in FIG. 7. Further, the scrapped-up lubricating oil gradually separated from the scraping up surface 91a by gravity as the scraping up section 91 moves in the circumferential direction, and dripped onto the surface of the planetary ball 50 present at a lower side or the like. In this manner, the continuously variable transmission 1 can supply the lubricating oil to each of the planetary balls 50 even in the operating state where the annular oil reservoir 100 is not formed. Accordingly, the continuously variable transmission 1 can stably supply the lubricating oil to each of the contact surfaces P1 and P2 regardless of the state of the operation (that is, the rotation), and thus, it is possible to secure the cooling performance of the contact surfaces P1 and P2 and the traction performance of the contact surfaces P1 and P2.

Further, the scraping up section 91 is formed such that a maximum value of the height thereof (a maximum height from the inner peripheral surface of the first cylindrical section 21a) becomes lower than a maximum height in the radial direction of the oil reservoir 100 (=a maximum depth of the oil reservoir 101). In other words, the scraping up section 91 is formed to have a size such that the entire section buried in the lubricating oil of the annular oil reservoir 100. Accordingly, in the continuously variable transmission 1, the dragging by the scraping up section 91 is suppressed in the operating state where the annular oil reservoir 100 is formed (that is, in the case of the operation at high speed), and thus, a loss due to stirring is reduced as compared to the related art. Accordingly, the continuously variable transmission 1 is capable of securing the cooling performance of the contact surfaces P1 and P2 and the traction performance of the contact surfaces P1 and P2 using the lubricating oil of the oil reservoir 100 while suppressing the loss due to stirring in the case of operation at high speed.

As described above, the continuously variable transmission 1 is capable of improving the durability of the first and second rotating members 10 and 20, or the planetary ball 50 regardless of the state of the operation (rotation), and further, capable of improving a transmission efficiency of the torque.

First Modified Example

In the continuously variable transmission 1 of the above-described embodiment, the lubricating oil of the annular oil reservoir 100 soaks the contact surfaces P1 and P2. Thus, when the oil reservoir 100 is formed, a dragging loss is generated in the contact surfaces P1 and P2 due to the lubricating oil, and there is a possibility of reducing the transmission efficiency of the torque. Meanwhile, for example, it is possible to provide a configuration in which the annular oil reservoir 100 is hardly formed by providing a through hole in the first cylindrical section 21a or the like, but in such a case, there is a possibility of introducing deterioration in the cooling performance of the first and second rotating members 10 and 20.

Accordingly, in a first modified example, it is configured such that the lubricating oil is supplied from another path to the contact surfaces P1 and P2 while achieving reduction in the dragging loss by thinning the thickness in the radial direction of the annular oil reservoir 100.

Figure 8:
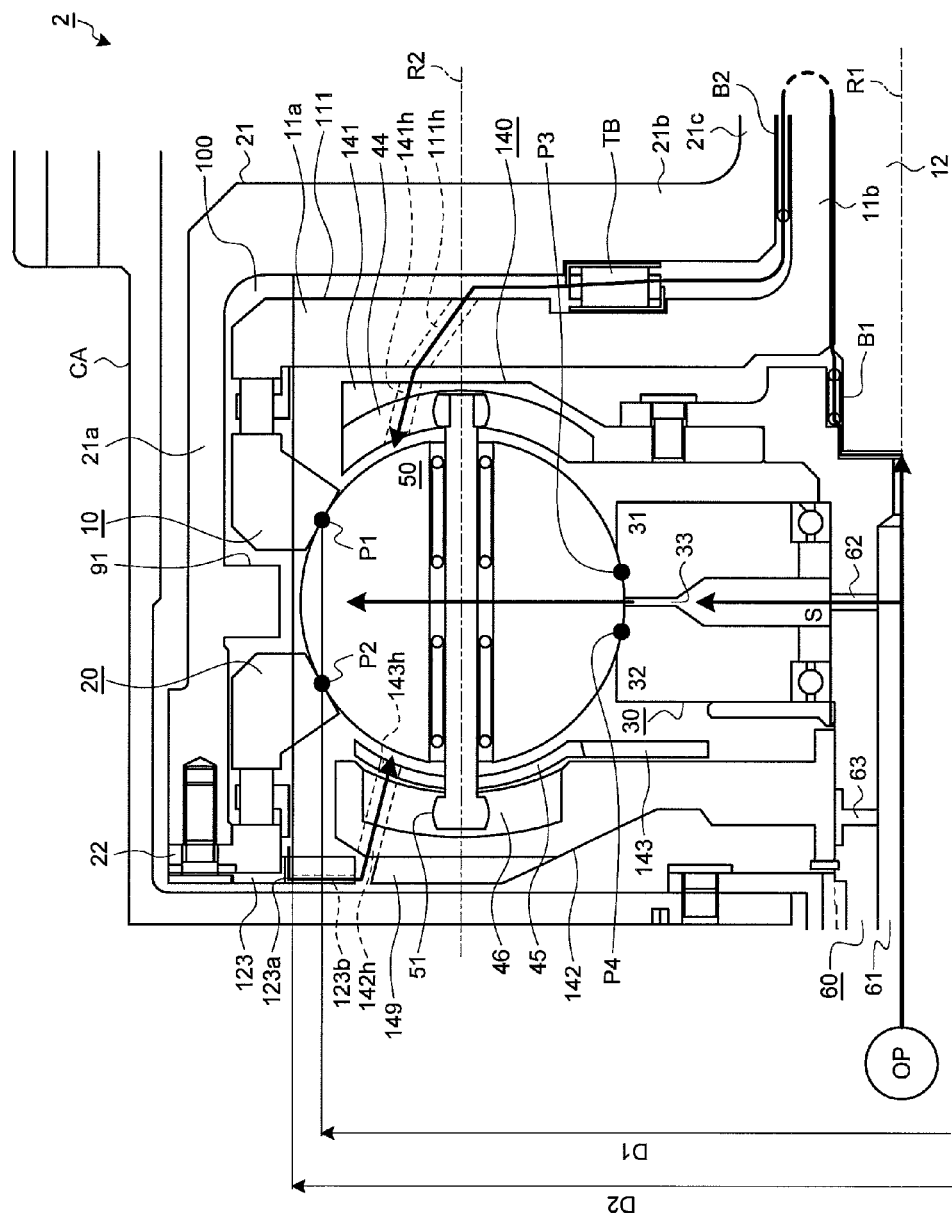
FIG. 8 is a cross-sectional view illustrating an embodiment of a configuration in a first modified example of the continuously variable transmission according to the present invention.

Reference numeral 2 in FIG. 8 indicates a continuously variable transmission of the first modified example. A continuously variable transmission 2 of the first modified example is obtained by changing the continuously variable transmission 1 of the embodiment regarding the following points.

First, the continuously variable transmission 2 is configured such that the inner diameter D2 of the annular oil reservoir 100 is larger than the diameter D1 of the circumference formed by the respective contact surfaces P1 and P2. For this reason, the continuously variable transmission 2 replaces the oil collecting member 23 with an oil collecting member 123. The oil collecting member 123 is configured by forming at least one through hole 123a in the axial direction, in the oil collecting member 23 of the embodiment. The through hole 123a is a discharge hole that discharges the lubricating oil of the annular oil reservoir 100, and determines the thickness of the oil reservoir 100. Thus, a size, a position, and the number of the through hole 123a are determined such that the oil reservoir 100 having the above-described inner diameter D2 is formed. In this example, the through holes 123a of the same number as the planetary balls 50 are radially formed at approximately equal intervals around the first rotation center axis R1.

Further, the height of the scraping up section 91 is determined so as to be soaked in the lubricating oil of the formed annular oil reservoir 100 even in the continuously variable transmission 2.

In the continuously variable transmission 2, the respective contact surfaces P1 and P2 are not soaked in the lubricating oil of the annular oil reservoir 100 by the through hole 123a. Thus, the lubricating oil is supplied to the contact surfaces P1 and P2 using the following configuration. Further, the lubricating oil of the oil reservoir 100 is stirred and scrapped up in the first and second rotating members 10 and 20, and thus, is attached to the surface of the planetary ball 50 by being conveyed or scrapped up from the first and second rotating members 10 and 20. The lubricating oil attached to the planetary ball 50 is supplied to the contact surfaces P1 and P2 depending on the rotation direction thereof, in some cases.

First, the contact surface P1 will be described.

The lubricating oil of the axial oil passage 61 exits a gap between the shaft 60 and the rotary shaft 12, passes a thrust bearing between the rotary shaft 12 and the cylindrical section 11b of an input shaft 111, and is sent to an end portion of the power source side of the input shaft 111. The lubricating oil is guided to a gap between the input shaft 111 and the output shaft 21 by a pump effect caused by each rotation of the input shaft 111 and the output shaft 21. Here, a gap between the disc section 11a and the disc section 21b is narrowed to an interval that allows the generation of the pump effect. Accordingly, the lubricating oil guided by the pump effect is supplied to the bearing B2 and the thrust bearing TB provided in the gap. Further, the input shaft 111 is configured by forming a through hole 111h to be described later in the input shaft 11 of the embodiment.

The lubricating oil supplied to the thrust bearing TB is further sent to an outer side in radial direction. Accordingly, in the continuously variable transmission 2, the lubricating oil that has exit the thrust bearing TB is sent to the contact surface P1. For this reason, at least one through hole 111h into which the lubricating oil that has exit the thrust bearing TB flows is provided in the disc section 11a of the input shaft 111. The through hole 111h has an inflow port of the lubricating oil to the outer side in the radial direction than the thrust bearing TB, and has a discharge port of the lubricating oil further to the outer side in the radial direction than the inflow port. The through hole 111h has a shape that gradually guides the lubricating oil to the outer side in the radial direction as approaching the discharge port from the inflow port, and connects the inflow port and the discharge port with a straight line, for example. Thus, the lubricating oil flowing in from the inflow port is guided inside the through hole 111h by the centrifugal force caused by the rotation of the input shaft 111, and is discharged from the discharge port. In this example, the through holes 111h of the same number as the number of the planetary balls 50 are radially disposed at approximately equal intervals around the first rotation center axis R1.

Figure 9:
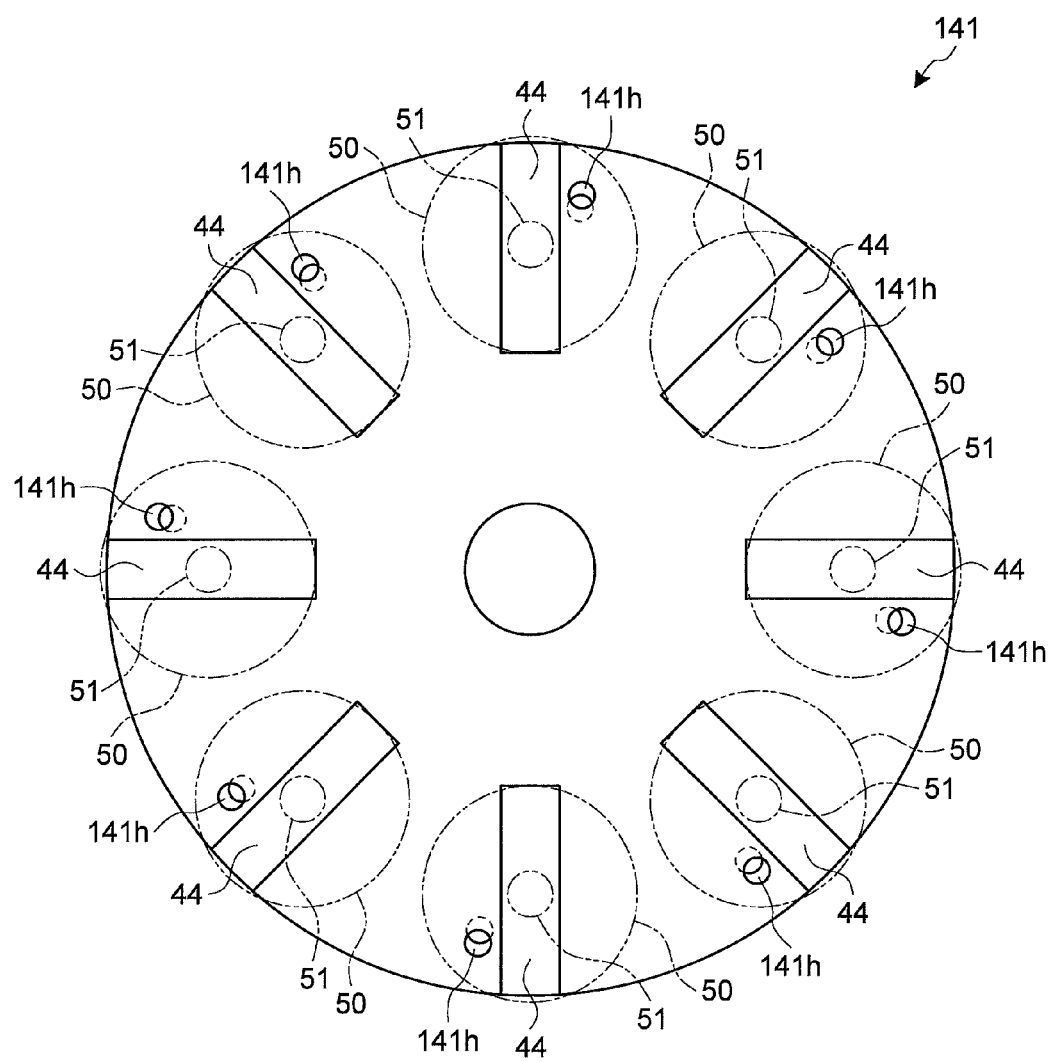
FIG. 9 is a diagram describing one fixed disc section of a carrier of the modified Example.

In the continuously variable transmission 2, a through hole 141h that guides the lubricating oil discharged from the through hole 111h to the surface of the planetary ball 50 is provided in a first fixed disc section 141 of a carrier 140. As illustrated in FIG. 9, the through hole 141h is disposed, for each of the planetary balls 50, radially at an approximately equal interval around the first rotation center axis R1. An inflow port of the lubricating oil of the through hole 141h is disposed to be substantially equivalent to a position in the radial direction of the discharge port of the through hole 111h, or to an outer side in the radial direction than the position. In addition, a discharge port of the lubricating oil of the through hole 141h is disposed further to the outer side in the radial direction than the inflow port. The through hole 141h has a shape gradually guides the lubricating oil to the outer side in the radial direction as approaching the discharge port from the inflow port, similarly to the through hole 111h, and for example, connects the inflow port and the discharge port with a straight line. Further, the through hole 141h has an angle with respect to the axial direction to be smaller than that of the through hole 111h. Thus, the lubricating oil flowing in from the inflow port is guided inside the through hole 141h using momentum in the case of being discharged from the through hole 111h, and is discharged from the discharge port. Further, the first fixed disc section 141 is configured by forming the through hole 141h in the first fixed disc section 41 of the embodiment.

Here, a shape or the like of the through hole 141h is determined such that the surface of the planetary ball 50 is present in a discharge direction of the through hole 141h, in order to send the discharged lubricating oil to the surface of the planetary ball 50. In the continuously variable transmission 2, the through hole 141h is formed such that the discharged lubricating oil is supplied to the contact surface P1 or closed to the contact surface P1.

Next, the contact surface P2 will be described.

The lubricating oil of the annular oil reservoir 100 is used as the lubricating oil to be supplied to the contact surface P2. For this reason, a path that guides the lubricating oil of the oil reservoir 100 to the surface of the planetary ball 50 is provided in the continuously variable transmission 2.

First, each of the through holes 123a of the oil collecting member 123 described above is used as the path. Since the lubricating oil is continuously sent from the oil pump OP during the operation, the lubricating oil of the oil reservoir 100 flows in the through hole 123a depending on the inflow amount thereof into the variable transmission, and is continuously discharged to a gap between the oil collecting member 123 and a wall surface of the casing CA. Accordingly, in the continuously variable transmission 2, a throttle hole (iris groove) 123b is formed on a wall surface of the oil collecting member 123 which faces the wall surface of the casing CA, and the lubricating oil is guided to the inner side in the radial direction via a throttle hole 123b. The throttle hole 123b is provided for each of the through holes 123a. A pump effect generated between the respective wall surfaces of the oil collecting member 123 and the casing CA according to the relative rotation of the oil collecting member 123 with respect to the casing CA is used for the guidance to the inner side in the radial direction. Thus, here, the gap between the respective wall surfaces is narrowed to an interval that allows the generation of the pump effect.

Figure 10:
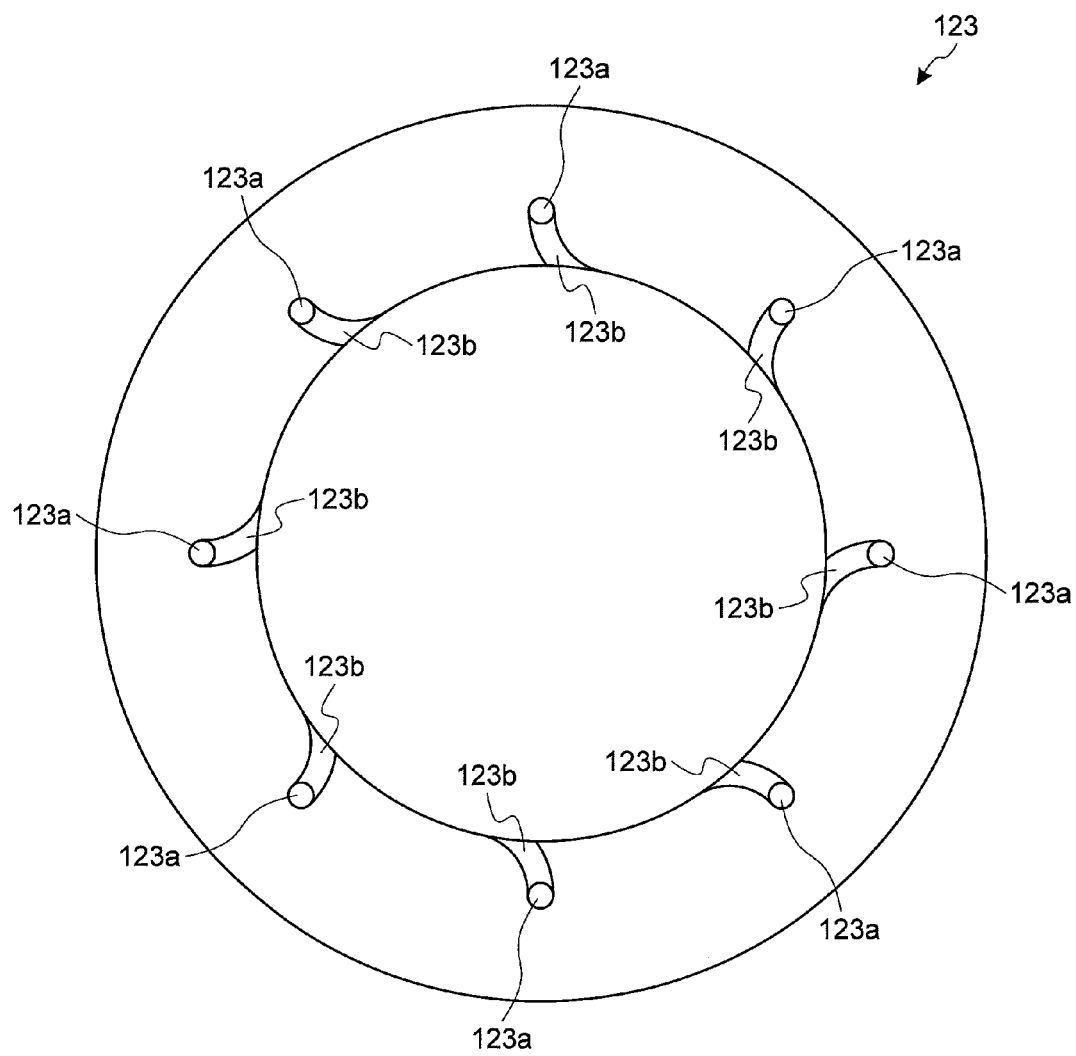
FIG. 10 is a diagram describing a throttle hole of the modified example.

The throttle hole 123b causes an end portion thereof to the outer side in the radial direction to be communicated with the discharge port of the through hole 123a. Here, as illustrated in FIG. 10, the end portion to the outer side in the radial direction of the throttle hole 123b is provided in the discharge port of the through hole 123a. Further, FIG. 10 is a diagram of the oil collecting member 123 viewed in the axial direction from the casing CA side. In a case where the radial direction having the end portion thereof to the outer side in the radial direction as a starting point of is assumed as a reference line, the throttle hole 123b is formed in an arc shape that is separated in the circumferential direction from the reference line as being directed to the inner side in the radial direction from the outer side in the radial direction. In addition, the throttle hole 123b has an end portion to the inner side in the radial direction to be opened to an inner peripheral surface of the oil collecting member 123.

The lubricating oil discharged from the through hole 123a is guided to the inner side in the radial direction along the throttle hole 123b by the pump effect, and is discharged from the end portion to the inner side in the radial direction of the throttle hole 123b. The lubricating oil discharged from the throttle hole 123b is sent to the surface of the planetary ball 50 via a through hole 142h of a rotating disc section 142 and a through hole 143h of a second fixed disc section 143 in the carrier 140. Accordingly, in the rotating disc section 142, a receiving section 149 of the lubricating oil that receives the lubricating oil discharged from the throttle hole 123b and guides the lubricating oil to the through hole 142h is provided on the casing CA side in the axial direction than the through hole 142h, and further in a portion facing the casing CA. Further, the rotating disc section 142 is configured by forming the through hole 142h and the receiving section 149 in the rotating disc section 42 of the embodiment. In addition, the second fixed disc section 143, is configured by forming the through hole 143h in the second fixed disc section 43 of the embodiment.

The receiving section 149 receives the lubricating oil discharged from the throttle hole 123b in a wall surface on an outer side in the radial direction thereof, and guides the lubricating oil to the through hole 142h positioned at the planetary ball 50 side. The wall surface on the outer side in the radial direction is inclined to the inner side in the radial direction as being directed in the axial direction to the planetary ball 50 side from the casing CA side. Here, the receiving section 149 and the through hole 142h are formed such that the wall surface of the receiving section 149 and a wall surface on an inner side in the radial direction of the through hole 142h are flush with each other. Accordingly, the lubricating oil received by the receiving section 149 flows in the through hole 142h also by aid of the momentum at the discharge due to the pump effect. Here, the receiving section 149 may be provided only at a place where the through hole 142h is disposed, or may be provided as an annular section being connected in the circumferential direction on the inner side in the radial direction of each of the through holes 142h. Further, in a case where the lubricating oil is guided to the through hole 142h using gravity, the receiving section 149 may be provided such that an inclination of the wall surface on the outer side in the radial direction thereof is changed depending on the disposed place of the through hole 142h. For example, the wall surface with respect to the through hole 142h disposed at the bottom, is inclined to the outer side in the radial direction as being directed in the axial direction to the planetary ball 50 side from the casing CA side.

Figure 11:
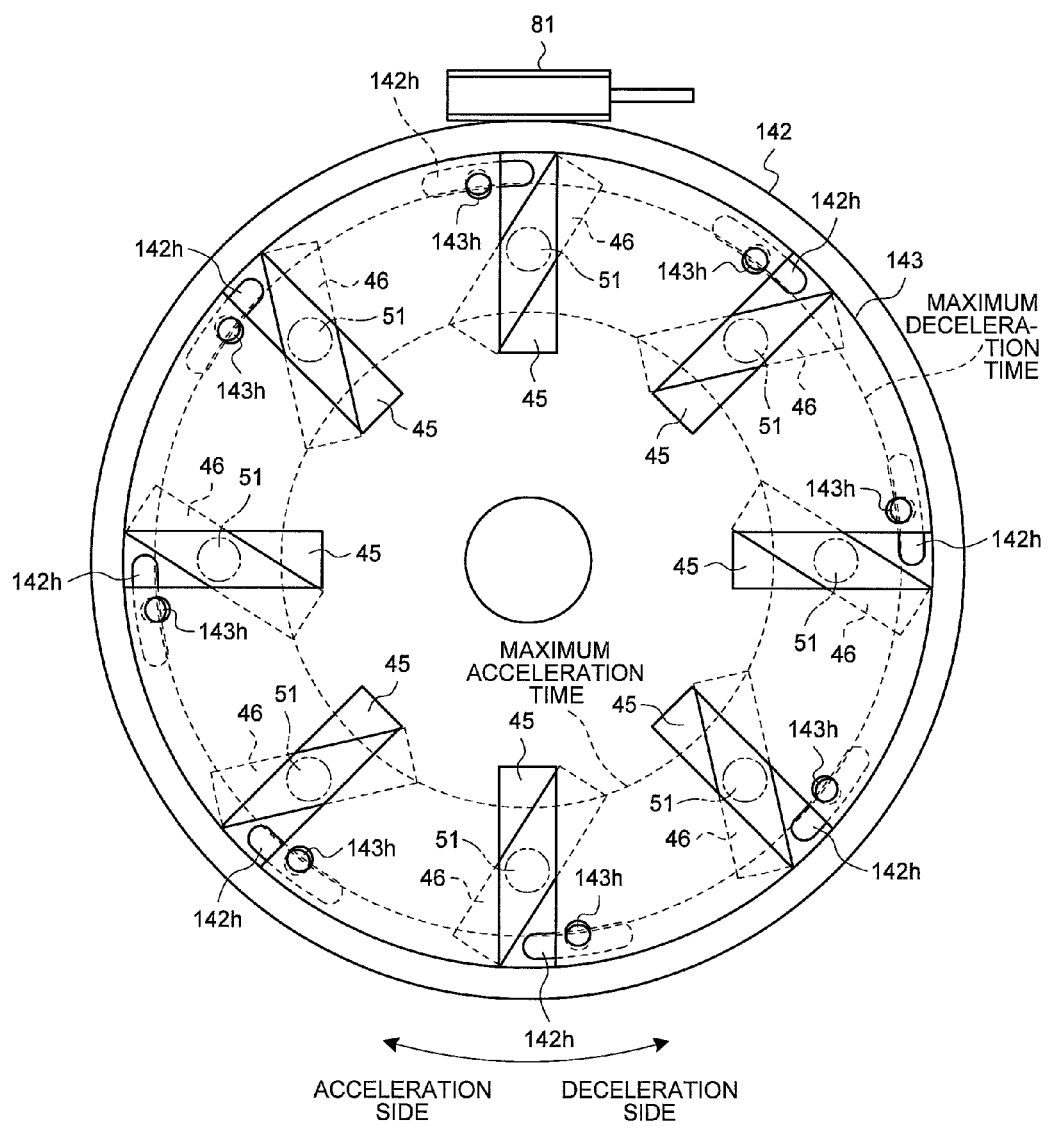
FIG. 11 is a diagram describing the other fixed disc section and a rotating disc section in the carrier of the modified example.

The through holes 142h and 143h directly uses the flow of the lubricating oil from the receiving section 149, and sends the lubricating oil to the surface of the planetary ball 50. Thus, the through holes 142h and 143h are formed so as to have the inclination equivalent to that of the wall surface on the outer side in the radial direction of the receiving section 149. Here, the rotating disc section 142 relatively rotates in the circumferential direction with respect to the second fixed disc section 143. Thus, as illustrated in FIG. 11, it is preferable that the through hole 142h of the rotating disc section 142 be a long hole in the circumferential direction depending on a width of the rotation thereof so that the lubricating oil flows in from the through hole 142h to the through hole 143h in any case of the gear ratio γ.

Here, in the continuously variable transmission 2, an inclination angle, a position, and the like of the wall surface on the outer side in the radial direction of the receiving section 149, and the through holes 142h and 143h are determined so as to be directed the discharge direction of the lubricating oil, in order to send the lubricating oil discharged from the through hole 143h to the surface of the planetary ball 50. In the continuously variable transmission 2, the wall surface on the outer side in the radial direction of the receiving section 149, and the through holes 142h and 143h are formed such that the discharged lubricating oil is supplied to the contact surface P2 or closed to the contact surface P2.

As described above, in the continuously variable transmission 2 of the first modified example, the lubricating oil of the oil reservoir 101 at the bottom is supplied to each of the contact surfaces P1 and P2 by the scraping up section 91 in the case of the operation at low speed where the annular oil reservoir 100 is hardly formed, similarly to the continuously variable transmission 1 of the embodiment. In addition, the lubricating oil is supplied also from the through holes 111h and 141h to the contact surface P1 as long as the pump effect is generated by each rotation of the input shaft 111 and the output shaft 21 even in the case of the operation at low speed. Meanwhile, in the case of the operation at high speed where the annular oil reservoir 100 is formed, the supply of the lubricating oil from the through holes 111h and 141h to the contact surface P1 is performed, and further, the lubricating oil of the annular oil reservoir 100 is supplied to the contact surface P2 via the through hole 123a, the throttle hole 123b, and the through holes 142h and 143h. Accordingly, the continuously variable transmission 2 can stably supply the lubricating oil to each of the contact surfaces P1 and P2 regardless of the state of the operation (that is, the rotation), and thus, it is possible to secure the cooling performance of the contact surfaces P1 and P2 and the traction performance of the contact surfaces P1 and P2. Further, the continuously variable transmission 2 is configured such that a thickness in the radial direction of the annular oil reservoir 100 is reduced as compared to that in the continuously variable transmission 1 of the embodiment, and thus, it is possible to secure the cooling performance of the contact surfaces P1 and P2 and the traction performance of the contact surfaces P1 and P2 while reducing the dragging loss in the contact surfaces P1 and P2. In addition, in such a case of the operation at high speed, the entire scraping up section 91 is soaked in the annular oil reservoir 100 similarly to the continuously variable transmission 1 of the embodiment. Accordingly, it is possible to secure the cooling performance of the contact surfaces P1 and P2 and the traction performance of the contact surfaces P1 and P2 while suppressing the loss due to stirring. Therefore, the continuously variable transmission 2 is capable of improving the durability of the first and second rotating members 10 and 20, and the planetary ball 50 regardless of the state of the operation (rotation), and further, capable of further improving the transmission efficiency of the torque as compared to the continuously variable transmission 1 of the embodiment.

Meanwhile, in this example, the description has been made regarding the configuration in which the lubricating oil supplied from the through holes 111h and 141h is guided to the contact surface P1, and the lubricating oil supplied from the through hole 123a, the throttle hole 123b, and the through holes 142h and 143h is guided to the contact surface P2 for convenience. However, in the continuously variable transmission 2, there is a possibility that the lubricating oil supplied from the through holes 111h and 141h is guided also to the contact surface P2, or a possibility that the lubricating oil supplied from the through hole 123a, the throttle hole 123b, and the through holes 142h and 143h is guided also to the contact surface P1 depending on the tilting angle of the planetary ball 50.

Second Modified Example

A second modified example has a configuration for a case where it is possible to supply the amount of the lubricating oil sufficient for securing the cooling performance and the traction performance to the contact surface P1 by the scraping up section 91 of the first modified example, or by the scraping up section 91, and the through holes 111h and 141h in the case of the operation at low speed where the annular oil reservoir 100 is hardly formed, and by the through holes 111h and 141h in the case of the operation at high speed where the annular oil reservoir 100 is formed. In such a case, in the contact surface P1, the lubricating oil of the annular oil reservoir 100 only becomes a cause that generates the dragging loss, and thus, it is preferable that the lubricating oil of the annular oil reservoir 100 not be formed.

Figure 12:
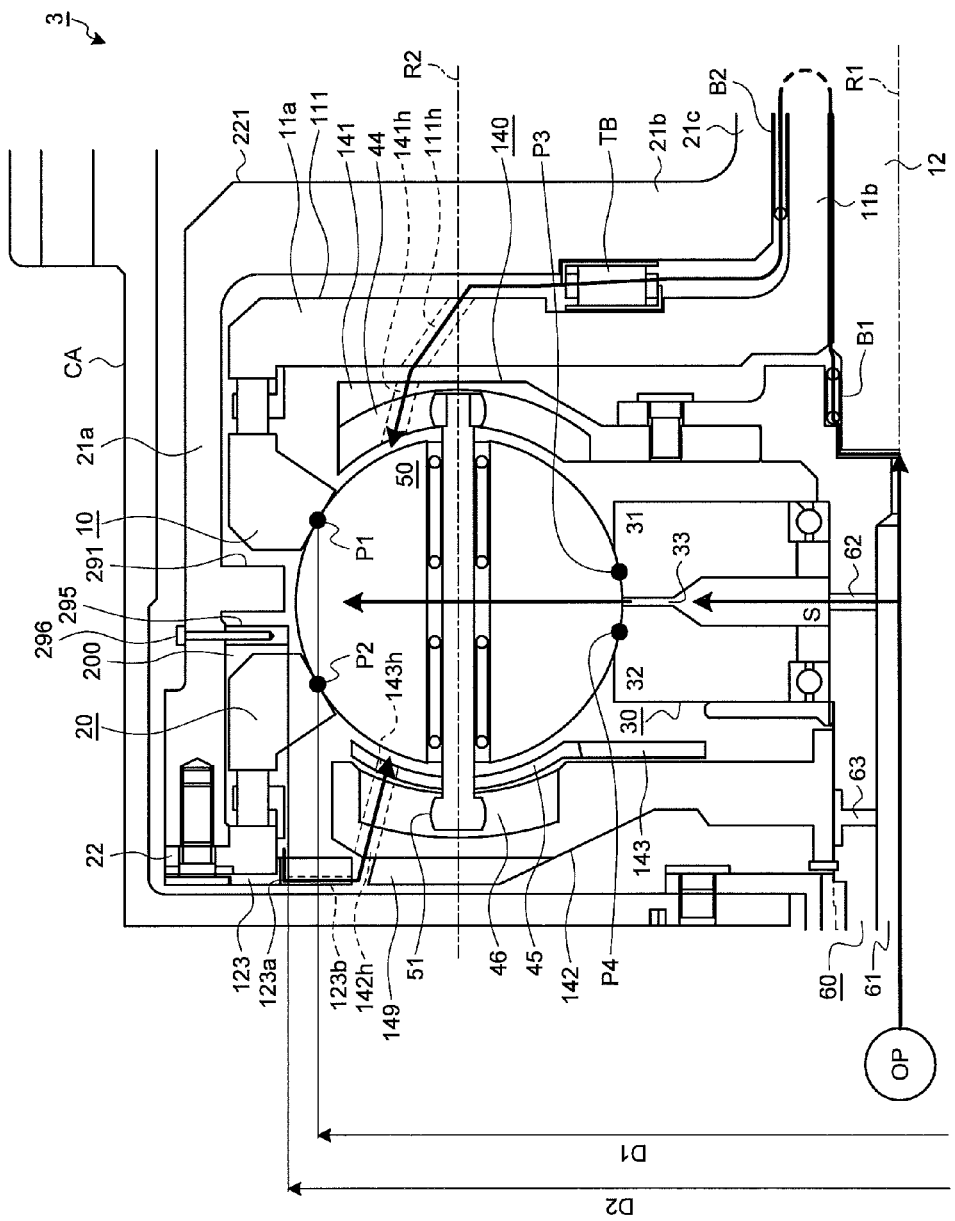
FIG. 12 is a cross-sectional view illustrating an embodiment of a configuration in a second modified example of the continuously variable transmission according to the present invention.

Accordingly, a continuously variable transmission 3 of the second modified example is configured such that the annular oil reservoir 100 is formed only on a side of the contact surface P2. For this reason, in the continuously variable transmission 3, an annular member 295 as a partition wall is disposed between the first rotating member 10 and the second rotating member 20 in the continuously variable transmission 2 of the first modified example, as illustrated in FIG. 12. The annular member 295 has an inner diameter to match with an inner diameter D2 of an annular oil reservoir 200, and is fixed to the inner peripheral surface of the first cylindrical section 21a of an output shaft 221 by a screw member 296 or the like. Further, the inner diameter D2 of the oil reservoir 200 is the same dimension as the inner diameter D2 of the oil reservoir 100 of the first modified example. In addition, the output shaft 221 is configured by providing a through hole through which the screw member 296 passes in the output shaft 21 of the embodiment or the first modified example, and further, by replacing the scraping up section 91 with a scraping up section 291 to be described later.

In the continuously variable transmission 3, the annular oil reservoir 200 is formed only on a side of the contact surface P2 by the annular member 295 in the case of operation at high speed. Further, it is desirable that a through hole be formed in a portion on an outer side in the radial direction than an inner peripheral surface of the annular member 295 in the output shaft 221 so that the lubricating oil is discharged from the through hole to outside (for example, a gap between the output shaft 221 the casing CA), in order to prevent the annular oil reservoir from being formed on a side of the contact surface P1.

In this manner, since the annular oil reservoir 200 is formed only on the side of the contact surface P2 in the continuously variable transmission 3, it is possible to supply the lubricating oil to each of the contact surfaces P1 and P2 while further reducing the dragging loss in the contact surface P1 as compared to the continuously variable transmission 2 of the first modified example. Accordingly, the continuously variable transmission 3 is capable of improving the durability of the first and second rotating members 10 and 20, and the planetary ball 50 regardless of the state of the operation (rotation), and further, capable of further improving the transmission efficiency of the torque as compared to the continuously variable transmission 2 of the first modified example.

Here, in the continuously variable transmission 3, it is desirable that the annular member 295 be disposed by being close to a side of the first rotating member 10 or a side of the second rotating member 20 in the axial direction than the above-described reference plane, in order to dispose the annular member 295 and the scraping up section 291. Further, it is desirable that a width in the axial direction of the scraping up section 291 be narrowed than that of the scraping up section 91 of the embodiment or the first modified example. In addition, the scraping up section 291 may be provided on a side wall surface of the annular member 295.

In this example, the annular member 295 is disposed to be close to the side of the second rotating member 20, and further, the scraping up section 291 is disposed between the annular member 295 and the first rotating member 10. Further, in this case, the above-described through hole in the output shaft 221 for preventing the annular oil reservoir from being formed on the side of the contact surface P1 is formed on an upper side than an oil surface of the oil reservoir 101 such that the oil reservoir 101 at the bottom is formed also on the side of the contact surface P1. Thus, the continuously variable transmission 3 is capable of supplying the lubricating oil to the contact surfaces P1 and P2 by the scraping up section 291 in the case of the operation at low speed where the annular oil reservoir 200 is hardly formed. In addition, in the case of the operation at high speed where the annular oil reservoir 200 is formed, the annular oil reservoir is not formed on the side of the contact surface P1, and thus, it is possible to achieve the additional reduction of resistance in stirring by the scraping up section 291.

REFERENCE SIGNS LIST 1, 2, 3 CONTINUOUSLY VARIABLE TRANSMISSION
10 FIRST ROTATING MEMBER (FIRST POWER TRANSMISSION ELEMENT)
11, 111 INPUT SHAFT
11a DISC SECTION
20 SECOND ROTATING MEMBER (SECOND POWER TRANSMISSION ELEMENT)
21, 221 OUTPUT SHAFT
21a FIRST CYLINDRICAL SECTION
23, 123 OIL COLLECTING MEMBER (ANNULAR MEMBER)
30 SUN ROLLER (THIRD POWER TRANSMISSION ELEMENT)
33 ANNULAR OIL PASSAGE
40, 140 CARRIER (FOURTH POWER TRANSMISSION ELEMENT)
41, 141 FIRST DISC SECTION (FIRST FIXED DISC SECTION)
42, 142 SECOND DISC SECTION (ROTATING DISC SECTION)

43, 143 THIRD DISC SECTION (SECOND FIXED DISC SECTION)
50 PLANETARY BALL (ROLLING MEMBER)
60 SHAFT (TRANSMISSION SHAFT)
61 AXIAL OIL PASSAGE
62 RADIAL DIRECTION OIL PASSAGE
91, 291 SCRAPING UP SECTION
111h, 123a, 141h, 142h, 143h THROUGH HOLE
123b THROTTLE HOLE
149 RECEIVING SECTION
295 ANNULAR MEMBER
296 SCREW MEMBER
CA CASING
OP OIL PUMP
P1, P2, P3, P4 CONTACT SURFACE
R1 FIRST ROTATION CENTER AXIS
R2 SECOND ROTATION CENTER AXIS

The invention claimed is:

1. A continuously variable transmission comprising:
a transmission shaft that serves as a center of rotation;
a first power transmission element, a second power transmission element, a third power transmission element and a fourth power transmission element that have a first rotation center axis coaxial with the transmission shaft, and configured to be relatively rotatable with one another in a circumferential direction;
a plurality of rolling members where each has a second rotation center axis, is disposed radially around the first rotation center axis, and further on an outer peripheral surface of the third power transmission element, is interposed between inner peripheral surfaces of the first and second power transmission elements, which are disposed to face each other, and further, is held by the fourth power transmission element in a freely tilting manner;
a transmission device configured to change a gear ratio between an input side and an output side by tilting each of the rolling members;
a rotary shaft that is coupled with one of the first and second power transmission elements, and is provided with a cylindrical section that covers the first to fourth power transmission elements, and each rolling member from an outer side in a radial direction;
an annular member that is coupled with the rotary shaft, and configured to form an annular oil reservoir formed of lubricating oil along an inner peripheral surface of the cylindrical section during operation; and
a scraping up section that is disposed between the first power transmission element and the second power transmission element, further, on an inner side in the radial direction than the inner peripheral surface of the cylindrical section, and further, on the outer side in the radial direction than the plurality of rolling members, and configured to scrape up the lubricating oil by rotating in the circumferential direction.

2. The continuously variable transmission according to claim 1, wherein
the scraping up section is formed such that the entire thereof is soaked in the lubricating oil of the annular oil reservoir.

3. The continuously variable transmission according to claim 1, wherein
the scraping up section is provided on the inner peripheral surface of the cylindrical section.

4. The continuously variable transmission according to claim 1, further comprising:
a casing configured to cover the rotary shaft from the outer side in the radial direction;
a through hole that is formed in the annular member, and configured to cause the lubricating oil of the annular oil reservoir to be discharged;
a throttle hole that is formed to be communicated with the through hole of the annular member on a wall surface which faces a wall surface of the casing in the annular member, configured to guide the lubricating oil of the through hole to the inner side in the radial direction, and that is formed in an arc shape; and
a through hole of the fourth power transmission element configured to guide the lubricating oil discharged from the throttle hole to a surface of the rolling member.

5. The continuously variable transmission according to claim 4, wherein
the through hole is formed such that an inner diameter of the annular oil reservoir is larger than a diameter of a circumference formed by a contact surface between the first power transmission element and the rolling member and a diameter of a circumference formed by a contact surface between the second power transmission element and the rolling member.

6. The continuously variable transmission according to claim 4, wherein
an annular partition wall is disposed on the inner peripheral surface of the cylindrical section between the first power transmission element and the second power transmission element, and the annular oil reservoir is formed between the partition wall and the annular member.

\* \* \* \* \*